(12) United States Patent
Laatikainen et al.

(10) Patent No.: US 11,484,791 B2
(45) Date of Patent: *Nov. 1, 2022

(54) METHOD FOR CONTROLLING A GAME PLAY

(71) Applicant: Supercell Oy, Helsinki (FI)

(72) Inventors: Rauli Laatikainen, Espoo (FI); Patrick Corander, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,007

(22) Filed: Sep. 20, 2021

(65) Prior Publication Data
US 2022/0072421 A1 Mar. 10, 2022

Related U.S. Application Data

(63) Continuation of application No. 16/548,948, filed on Aug. 23, 2019, now Pat. No. 11,123,637.

(51) Int. Cl.
*A63F 13/525* (2014.01)
*A63F 13/822* (2014.01)

(52) U.S. Cl.
CPC .......... *A63F 13/525* (2014.09); *A63F 13/822* (2014.09)

(58) Field of Classification Search
CPC .............................. A63F 13/525; A63F 13/822
See application file for complete search history.

(56) References Cited

U.S. PATENT DOCUMENTS 9,814,967 B1 * 11/2017 Bone ....................... A63F 13/35

OTHER PUBLICATIONS

Shogun—Total War—Manual, 2000, Electronic Arts. (Year: 2000).*

* cited by examiner

*Primary Examiner* — Werner G Garner
(74) *Attorney, Agent, or Firm* — Ziegler IP Law Group, LLC

(57) ABSTRACT

A computer implemented method for controlling a game play. The method includes rendering a game view on a display of a computing device, the game view including a first area and a second area; displaying one or more first objects in the first area, the one or more first objects configured to execute one or more actions in the first area, the one or more actions being executed at a first execution speed; detecting a selection of a second object in the second area of the display; and changing an execution speed of the one or more actions being executed by the one or more first objects in the first area to a second execution speed while it is detected that the second object is selected.

17 Claims, 21 Drawing Sheets

METHOD FOR CONTROLLING A GAME PLAY

TECHNICAL FIELD

The present disclosure relates generally to a gaming environment, and more specifically, to a method for controlling game play in a graphical user interface of a gaming environment. Moreover, the present disclosure relates to a computing device for controlling a game play in a graphical user interface of a gaming environment. Furthermore, the present disclosure also relates to software products stored on non-transitory (non-transient) machine-readable data storage media, wherein the software products are executable upon computing hardware of a computing device to implement the aforesaid methods.

BACKGROUND

In recent years, the use of electronic devices, such as smartphones, tablets, etc., for the purpose of entertainment has gained popularity. One of the implementations of the electronic devices for entertainment is their use as gaming systems for mobile gaming. An important aspect of any gaming system implemented on an electronic device is an ease with which a user can interact with a user interface of a game to control various operations of the game. Most of these electronic devices incorporate touch-sensitive display screens, and the gaming applications can be controlled through such touch sensitive operations on such displays.

Typically, strategy games have an object (like a character) which is controlled by the user to complete the objectives or missions of the game such as collecting rewards and recognitions, building various structures and so forth. Such games have increasingly become more intricate and demanding in terms of attention and strategy making, with real-time games demanding greater focus of a player on the game. Additionally, it is observed that sometimes conventional war-based strategy games become much intense and a lot of action is displayed on the screen at the same time, which may become challenging for the player to follow. This may often lead to untimely and improper decision making, leading to inappropriate strategies and ultimately resulting in loss or non-realization of objectives which may be frustrating to player.

Furthermore, another problem associated with current strategy games is that it requires the user to act in real time while the game is in play and does not let the user to contemplate upon the future course of actions before the game begins. This requires spontaneous decision making on part of the user under the given time frame, often leading to inaccurate decision making and inefficient strategies to tackle the objective. Furthermore, current strategy games do not allow the users to engage into the game activities/objectives prior to the commencement of the game i.e. before a start button or the like is pressed. Thus, pre-emptive strategy making is a concept that is currently not entertained by existing gaming systems.

Therefore, in light of the foregoing discussion, there exists a need to overcome the aforementioned drawbacks of the current games and provide an efficient method of controlling game play.

SUMMARY

The present disclosure seeks to provide a computer implemented method for controlling a game play. The present disclosure also seeks to provide a computing device for controlling a game play. Specifically, the present disclosure provides a method that facilitates user interactions by providing an improved user experience, by sensing and obtaining user inputs through touching or swiping operations performed on a graphical user interface. The present disclosure seeks to provide a solution to the existing problems associated with conventional methods of game play that are often unsatisfying to the user. An aim of the present disclosure is to provide a solution that overcomes at least partially the problems encountered in prior art, and provides an efficient, interactive and seamless approach for controlling a game play.

In one aspect, an embodiment of the present disclosure provides computer implemented method for controlling a game play, the method comprising:
  rendering a game view on a display of a computing device, the game view comprising a first area and a second area;
  displaying one or more first objects in the first area, the one or more first objects configured to execute one or more actions in the first area, the one or more actions being executed at a first execution speed;
  detecting a selection of a second object in the second area of the display; and
  changing an execution speed of the one or more actions being executed by the one or more first objects in the first area to a second execution speed while it is detected that the second object is selected.

In another aspect, an embodiment of the present disclosure provides a computing device for controlling game play, the computing device comprising:
  a display; and
  a processing unit comprising at least one processor, the at least one processor being configured to:
render a game view on the display, the game view comprising a first area and a second area;
detect a selection and a de-selection of a second object on the display; and
display one or more first objects in the first area performing one or more actions with an execution speed equal to a first execution speed; and
wherein upon detection of the selection of the second object, the at least one processor is configured to change the execution speed of the one or more first objects to a second execution speed.

Embodiments of the present disclosure substantially eliminate or at least partially address the aforementioned problems in the prior art, and provides an efficient method of controlling a game play to provide the user ample time to strategize and arrive at a decision prior to taking an action in the game play.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
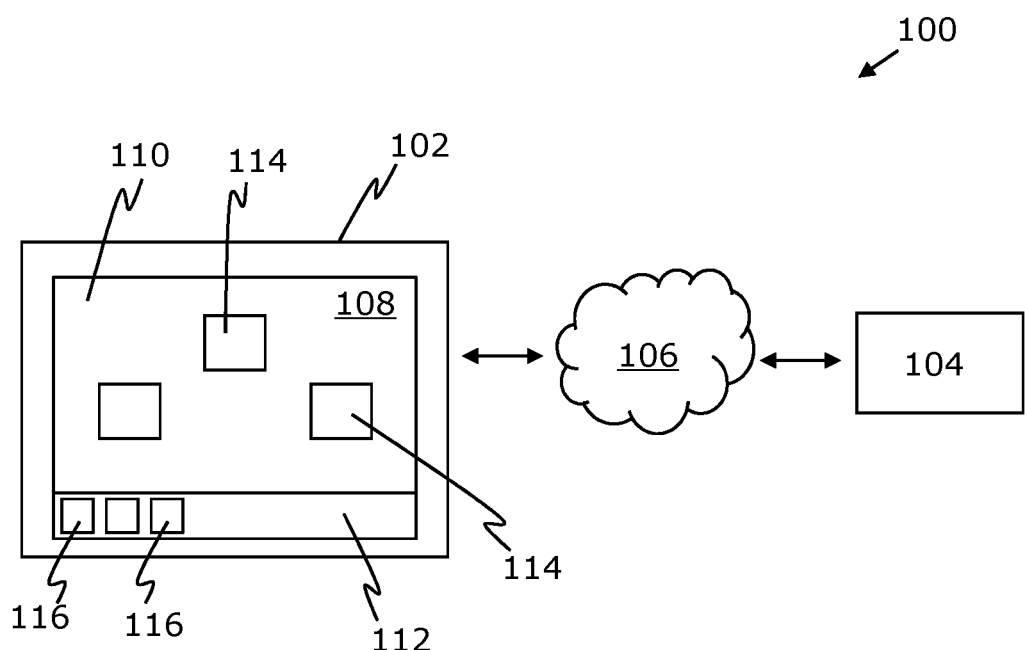
FIG. 1 is a schematic illustration of a block diagram of a computing device for controlling a game play, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides computer implemented method for controlling a game play, the method comprising:
rendering a game view on a display of a computing device, the game view comprising a first area and a second area;
displaying one or more first objects in the first area, the one or more first objects configured to execute one or more actions in the first area, the one or more actions being executed at a first execution speed;
detecting a selection of a second object in the second area of the display; and
changing an execution speed of the one or more actions being executed by the one or more first objects in the first area to a second execution speed while it is detected that the second object is selected.

In another aspect, an embodiment of the present disclosure provides a computing device for controlling game play, the computing device comprising:
a display; and
a processing unit comprising at least one processor, the at least one processor being configured to:
render a game view on the display, the game view comprising a first area and a second area;
detect a selection and a de-selection of a second object on the display; and
display one or more first objects in the first area performing one or more actions with an execution speed equal to a first execution speed; and wherein upon detection of the selection of the second object, the at least one processor is configured to change the execution speed of the one or more first objects to a second execution speed.

The present disclosure provides a computing device for controlling a game play. The computing device comprises a display and a processing unit comprising at least one processor. The processing unit is operable to execute a software product, which results in generating and rendering a graphical user interface on the display. In the present disclosure, the computing device, along with its processing unit, the software product and the graphical user interface, are implemented to execute the said method to control the game play. Examples of the computing device include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), Handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs).

Throughout the present disclosure the term "processing unit" refers to a computational element that is operable to respond to and processes instructions that drive the system. Optionally, the at least one processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor unit" may refer to one or more individual processors, processing devices and various elements associated with a processing device that may be shared by other processing devices.

Additionally, the one or more individual processors, processing devices and elements are arranged in various architectures for responding to and processing the instructions that drive the system.

In the present examples, the game play can be one of an action game, a role-playing game (RPG), a strategy game, a shooting game, a racing game and the like. For the purpose of the present disclosure, the game play is a strategy game. In an example, the game play is a war-based strategy game. It will be appreciated that such game play may include a game view that is rendered in the graphical user interface on the display. In an embodiment, the game play may incorporate multiple users (also referred to as "players" and the two terms have been interchangeably used hereinafter), such that each user is provided with respective home bases in a game field. Each of the players can attack home bases of the opponent player(s) and vice-versa. Furthermore, the players can build their own defendable areas which can be attacked by other players during the game play. Throughout the present disclosure the term "user" as used herein relates to a person (i.e., human being) using the computing device to access the play and perform user specific actions in the game play.

The game view comprises a first area and a second area which are rendered on the display of the computing device. Notably, the processing unit is configured to render the game view with the first area and the second area. Throughout the present disclosure the term "first area" as used herein relates to portion of the game view displaying one or more first objects performing one or more actions in the first area. The first area is the area having one or more first objects positioned therein, and with the one or more first objects executing one or more actions therein. Further, the first area is also utilized for placing second objects therein. In an example, the first area is a battle field having a number of enemy bases, enemy soldiers and the like performing actions such as defending the base. Further, the enemy bases can be attacked by the second objects that can be placed in the first area from the second area. Throughout the present disclosure, the term "second area" as used herein relates to a portion of the game view displaying a number of second objects that can be placed in the first area by the user as per discretion thereof. Notably, the second area displays user-selectable options that are can be selected by the user to perform a specific task. Notably, the first area may be understood as an area in the game view displaying the one or more first objects performing one or more actions, whereas the second area may be understood as an area in the game view displaying the second object as a user-selectable option. It will be appreciated that the first area and the second area are displayed at the same time to the user by splitting the game view into two areas, the first area and the second area.

Throughout the present disclosure the term "first objects" as used herein relates to objects displayed in the first area configured to execute the one or more actions. Normally, the one or more actions are executed with a first execution speed. Optionally, the one or more first objects comprise one or more of enemy troops, enemy weapons, enemy bases and enemy tools. In an example, the first objects can be characters or avatars in the first area executing one or more actions with the first execution speed. The first objects may include, but do not limit to, a graphical representation of a soldier, a troop of soldiers, weapons systems such as tanks and other vehicles, or any other person or even an animal or fictional character configured to execute one or more actions in the first area. In another example, the first objects can be stationary objects positioned in the first area that serve as target objects in the game play. In such an example, the first objects may include, but do not limit to, buildings, bases, military installations, walls, weapon systems, and mines. The first objects may possess various capabilities that allow the first objects to perform the one or more actions that are used to accomplish a goal, such as defending against an attack. In an example, the first object is configured to execute the one or more actions such as move from one location to the other, pick up and move weapons from one location to another, fire weapons such as guns, throw weapons such as grenades, knives, and the like, drive transportation units such as jeeps, tanks, choppers from one location to the other. In further example, the first objects are able to attack on the second objects and kill or destroy the second object. As used herein, one or more actions can be tasks or activities that the first objects are configured to perform. Notably, the one or more actions of the one or more first objects in the first area are autonomously controlled. Herein the term "autonomously controlled" may be understood that the one or more actions performed by the one or more first objects are independent of user intervention. Optionally, the one or more actions of the one or more first objects are controlled by the processing unit of the computing device.

Throughout the present disclosure the term "second object" as used herein relates to an object displayed in the second area. Optionally, the second object is a resource configured to perform an operation on the one or more first objects and comprise at least one of a soldier, a troop unit, a weapon system, a transport system, an aid, and a power enhancement tool. Notably, the second object is a user-selectable option that is displayed in the second area. The second object may possess various capabilities, or a skill level to perform an operation on the one or more first objects. In an example, the second object is a character or avatar displayed in the second area which when selected by the user and placed in the first area, performs an operation on the one or more first objects. In an example, the second object is troop unit having a number of soldiers, each of the soldiers having a gun configured to be fired at the one or more first objects in the first area in order to kill the enemy soldiers and destroy the enemy bases. In another example, the second object is a weapon system such a grenade or a bomb which is configured to destroy the enemy bases and enemy bases in a portion of the first area where the grenade or the bomb is aimed at. In yet another example, the second object is an airdrop having one or more of medical aids, food packets, water bottles, and the like which can be provided to the soldiers fighting in the enemy base. It will be appreciated that the term "second object" may also include more than one second objects that are displayed in the second area, and therefore should not unduly limit the scope of the claims appended herein.

In an embodiment, the first area comprises a third area and a fourth area. The selected second object is configured to be deployed from the second area to the third area, and the one or more first objects are configured to be positioned in the fourth area. The second area is utilized for displaying the second object for selection therefrom and the third area is utilized for deploying the selected second object. Notably, the fourth area comprises the one or more first objects performing the one or more actions. In an example, the computer implemented method comprises selecting the second object from the second area, and dragging the selected second object from the second area to the third area where the second object is de-selected (i.e. released). The third area may be considered as a playing field for the user where one or more user-selection actions are performed, while the fourth area is considered as an action field where one or more game actions such as an attack is performed. Notably, the second object may be released at any location in the third area depending upon a strategy formulated by the user. It will be appreciated that when the second object is released in the third area, the second object is configured to autonomously move from the third area to a specific target in the fourth area with the first execution speed to perform an action thereupon. In one or more embodiments, the second object is configured to be dragged to the fourth area and released at a specific position in the fourth area depending upon a strategy formulated by the user. For example, the second object such as a grenade can be directly released over the first object such as an enemy base which is to be destroyed. In another example, the second object such as an airdrop can be directly released over the soldiers to provide them with energy supplies, medical supplies and the like.

According to an embodiment, the first area further comprises a home base area including a headquarter for managing the second object, a lab for upgrading one or more skills of the second object, and a transportation unit for moving the second object from the third area to the fourth area. Optionally, the headquarter is a graphical representation of a building or an object for managing the second object. Notably, the headquarter is configured to manage playing cards such as a soldier playing card, a troop unit playing card, a weapon system playing card, a transport system playing card, an aid playing card, or a power enhancement tool playing card that can be displayed in the second area. In some examples, the headquarter can also be utilized to upgrade one or more skills of the second object playing card displayed in the second area. Optionally, the headquarter is configured to display a level of the skills possessed by each of the second objects. In one or more examples, the headquarter also displays a total number of awards collected by the user as way of representing progress of a particular user in the game play.

Optionally, the lab is a graphical representation of a building or an object for upgrading one or more skills of the second object. Notably, each of the second objects possess a particular level of skills, and can be upgraded to a higher level in the lab. In an example, a particular second object, such as a particular soldier possessing a gun firing 10 rounds per minute can be upgraded to higher level gun possessing a gun firing 20 rounds per minute. In another example, a particular second object is a weapon such as a grenade capable of destroying two blocks in the fourth area can be upgraded to a higher level grenade capable of destroying four blocks in the fourth area.

Optionally, the transportation unit is a graphical representation of a vehicle or an object for moving the second object from the third area to the fourth area. In an example, the transportation unit can be a chopper which can be utilized for moving the second object from the third area to the fourth area. In another example, the transportation unit can be tank which can be utilized for moving the second object from the third area to the fourth area.

Additionally, the first area may also comprise one or more obstacles, such as walls, to restrict movement of the one or more first objects or second objects to specific areas within the game field. Optionally, the game field comprises one or more elements, such as stars, health pick-ups or ammunition pick-ups, to provide assistance to the user and/or increase a score associated with performance of the player. Moreover, the user interface may also present one or more indicators to provide information to the player, such as information associated with a score of the game or health of the second objects. In some examples, the graphical objects are represented by different shapes and/or different colours. In other examples, the graphical objects are represented by different symbols, for example, such as different alphabets. In some examples, the user interface also comprises various signs, such as a first sign displaying a name of the user, a second sign displaying a number of second objects or playing cards available in the second area, a third sign displaying capabilities or skills of associated with a selected second object at a given instant of time, a fourth sign displaying a number of energy refills units available for use, a fifth sign displaying a number of rewards collected by the second object, etc.

The present computer implemented method comprises detecting a selection of the second object in the second area of the display. Notably, the processing unit is configured to detect a selection and a de-selection of a second object by a pointer device on the display. In the game play, the user may select the second object to subsequently make the second object perform a certain operation on the one or more first objects, related to the game play. Further, the computer implemented method comprises detecting a de-selection or a release of the selected second object by the pointer device in the first area. Optionally, the second object is configured to be selected by contacting a pointer device on the display at the second object in the second area and dragging the pointer device with the selected second object to the first area while maintaining the contact of the pointed device on the display with second object, and a de-selection of the second object comprises terminating the contact of the pointer device on the display with the second object in the first area. In the present context, the selection of the second object comprises contacting the pointer device on the display at the second object in the second area and dragging the pointer device to the first area while maintaining the contact on the display with second object and the de-selection of the second object comprises terminating the contact of the pointer device on the display with the second object in the first area.

For making the selection, a user of the computing device employs the pointer device, e.g., one or more of his/her fingers (or a stylus) and performs touching operations at one or more locations in the graphical user interface as rendered on the display. Herein, the display is an input-output device configured to detect an input corresponding to clicking, tapping and swiping movement of the pointer device over thereof. In one or more examples, the display is a multi-touch sensitive screen, capable of sensing, touching or swiping operations performed at multiple points on the screen simultaneously. Furthermore, instead of using fingers, the swiping operation can also be performed through a mouse, by pointing and tapping the mouse initially at a point on the display, dragging the pointer on the screen along the desired path, through the mouse, and finally releasing the mouse at the final position. Additionally, any other display sensitive device or an organ, e.g., a pen or any substantially pointed article, can be used as a pointer device for performing the touching or the swiping operation on the display.

For the purposes of the present disclosure, the display is a touch-sensitive display; however, it will be appreciated by a person skilled in the art that the disclosed embodiments can be implemented on other display types with suitable input devices without any limitations. Optionally, the touch-sensitive display is configured to sense a pressure applied by the pointer device, including finger or any other touch-sensitive object. In one example, the touch-sensitive display may be a capacitive touch screen that is operable to sense changes in capacitance to detect touch thereon. In another example, the touch-sensitive display may be a resistive touch screen that is operable to sense changes in resistance to detect touch thereon. In yet another example, the touch-sensitive display is an optical touch screen that is operable to sense changes in reflectivity to detect touch thereon.

Optionally, the computer implemented method further comprises rendering a start button on the display in response to deployment of the second object in the third area. Optionally, the computer implemented method further comprises detecting a selection of the start button, and moving the deployed second object from the third area to the fourth area with the first execution speed in response to the selection of the start button. In an example, the start button is rendered on the display when the second object is deployed in the second area. Notably, the second object does not move from the position it is deployed in the third area until the start button is pressed by the user. Such a method ensures that the user has ample time to strategize about the game play and decide as to which playing cards of the second object, he/she desires to deploy. Notably, the provision of the start button enables the user to deploy more than one second object in the third area before pressing the start button. The implementation of the start button further allows the user to retract second objects already deployed in the third area, and deploy another second object as desired, as the game play is not immediately commenced on deploying of the second object but on selection of the start button. Such a provision enables the user to efficiently strategize the game play before commencement of the game.

As aforementioned, the one or more first objects perform one or more actions in the first area with the first execution speed. It will be appreciated that the second object when placed in the first area is configured to perform one or more operations or actions with the first execution speed. Throughout the present disclosure the term "execution speed" as used herein refers to rate at which one or more first objects are displayed in the first area. Notably, the execution speed of an object corresponds to number of frames being displayed in a certain time for that object on the display of the computing device. For the purpose of the present disclosure, the execution speed may be defined as the speed of one or more actions of the first objects in the first area that is autonomously controlled by the processing unit. Throughout the present disclosure the term "first execution speed" refers to the speed with which the one or more first objects performing one or more actions are rendered on the display, when a selection of second object is not detected.

Optionally, the computer implemented method further comprises synchronizing the one or more actions of the one or more first objects with a first clock operating at a first speed corresponding to the first execution speed. In an example, the actions such as movement of soldiers from the third area to the fourth area, the firing of bullets by the soldiers on the enemy bases, the throwing of grenades on the enemy bases and the like are rendered on the display with the first execution speed.

The computer implemented method comprises changing the execution speed of the one or more actions being executed by the one or more first objects in the first area to a second execution speed while it is detected that the second object is selected. It will be appreciated that the execution speed of the one or more first objects in the first area is changed to the second execution speed for a duration of the selection of the second object by the pointer device. Throughout the present disclosure the term "second execution speed" as used herein refers to the speed with which the one or more first objects performing one or more actions are rendered on the display, when a selection of second object is detected.

Optionally, the second execution speed is slower than the first execution speed. That is, the one or more actions performed by the first objects are slower when the selection of the second object is detected as compared to when the selection of the second object is not detected. Optionally, the second execution speed is 2-10 times slower than the first execution speed. In an example, the first execution speed is x frames per second (fps), then the second execution speed may be from x/2, x/3, x/4, x/5, x/6, x/7, or x/8 fps up to x/4, x/5, x/6, x/7, x/8, x/9 or x/10 fps.

Optionally, the computer implemented method further comprises synchronizing the one or more actions of the one or more first objects with a second clock operating at a second speed corresponding to the second execution speed for a duration of the selection of the second object by the pointer device. It will be appreciated that prior to detection of the selection of the second object, the first objects are configured to execute one or more actions with the first execution speed, but when the selection of the second object is detected in the second area, the first objects are configured to slow down. Optionally, during the duration of selection of the second object, i.e. the duration in which the second object is selected and is dragged into the first area by the pointer device, the speed of one or more actions of the one or more first objects is slowed down, say for example by a factor of two. In an example, when the second object, such as a soldier is selected in the second area and dragged into the third area to be precisely placed in the third area, the one or more first objects configured to execute one or more actions in the fourth area are slowed down. In such an example, if a particular first object was to cover a distance of L in the game view as rendered on the display with the first execution speed, the particular object will cover a distance of L/2 in the game view as rendered on the display with the second execution speed. It is to be understood that when a particular second object is selected, the first execution speed of all the other objects including the first objects and the second object that are performing an action in the fourth area and/or the third area is changed to the second execution speed. It will be appreciated that such a method of slowing down of the one or more first objects in the fourth area facilitates user interaction in the game play and enables the user to better strategize during the play as slowing down of the actions in the enemy area in the fourth area provides adequate time to the user to strategically deploy the second objects in the third area.

The computer implemented method further comprises changing the execution speed of the one or more actions being executed by the one or more first objects in the first area to the first execution speed when it is detected that the second object is no longer selected. Notably, the method comprises changing the execution speed of the one or more first objects in the first area to the first execution speed in response to the release of the selected second object in the first area. In an example, when the second object, such as a soldier is released in the third area, the execution speed of one or more first objects is changed back to the first execution speed. Optionally, the computer implemented method further comprises re-synchronizing the one or more actions of the one or more first objects with the first clock in response to detecting the de-selection of the selected second object in the first area.

Optionally, the computer implemented method further comprises providing a control option on the display which when selected is configured to define a ratio of the second execution speed to the first execution speed. Notably, the user is prompted to define the ratio of the second execution speed to the first execution speed. The ratio of the second execution speed to the first execution speed defines a factor by which the first execution speed is slowed down to achieve the desired execution speed. In an example, the first execution speed is "x", and the ratio defined by the user is "1/2", then the resultant second execution speed will be 1/2 times x. Herein, the second execution speed will be slower than the first execution speed. In another example, the first execution speed is "y", and the ratio defined by the user is "1/4", then the resultant second execution speed will be 1/4 times x. Herein, the second execution speed will be slower than the first execution speed. In an alternative embodiment, the first execution speed is "z", and the ratio defined by the user is "2", then resultant second execution speed will be 2 times x. Herein, the second execution speed will be faster than the first execution speed. Notably, the control option can be presented on the display by any suitable manner known in the art. In an example, the user is prompted to enter a numerical value to define the ratio of the second execution speed to the first execution speed. In another example, the control option is presented on the display in the form of predefined ratios of the second execution speed to the first execution speed, and the user is prompted to select any one of the ratios. In yet another example, the control option is presented on the display in the form of slider control with a provision to swipe the slider to increase or decrease the ratio of the second execution speed to the first execution speed as desired by the user. It will be appreciated that the control option is provided to the user prior to the commencement of the game. Further, the user is also allowed to increase or decrease the ratio in between the gameplay, via a "pause" option provided in the game.

According to an embodiment, the computer implemented method further comprises connecting a plurality of computing devices to a server to facilitate an online multiplayer gaming system. For this purpose, the method comprises rendering the game view concurrently on the respective displays of the plurality of computing devices. Notably, the graphical user interfaces are generated temporally concurrently on displays of the plurality of computing devices, to facilitate interactions of the plurality of users with the graphical user interfaces. The method further comprises coordinating the one or more actions of the one or more first objects in the game play on the plurality of computing devices via the server. Beneficially, the graphical user interfaces generated on the plurality of computing devices are coordinated and synchronized through the server, and changed on the plurality of computing devices concurrently with time.

The term "server" as used herein relates to a structure and/or module that include programmable and/or non-programmable components configured to store, process and/or share information. Optionally, the server includes any arrangement of physical or virtual computational entities capable of enhancing information to perform various computational tasks. Furthermore, it should be appreciated that the server may be both single hardware server and/or plurality of hardware servers operating in a parallel or distributed architecture. In an example, the server may include components such as memory, a processor, a network adapter and the like, to store, process and/or share information with other computing components, such as user device/user equipment.

Further, herein, the communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks. Additionally, or alternatively, the computing devices may use their own Bluetooth® network, and connect to a Bluetooth® server, to synchronize with other electronic devices. The network environment may be implemented in various ways, depending on various possible scenarios. In one example scenario, the network environment may be implemented by way of a spatially collocated arrangement of the server and the database. In another example scenario, the network environment may be implemented by way of a spatially distributed arrangement of the server and the database coupled mutually in communication via the communication network. In yet another example scenario, the server and the database may be implemented via cloud computing services.

The computer implemented method further comprises re-changing the execution speed of the one or more first objects in the game play on each of the computing devices to the second execution speed upon detection of selection of the second object on any one of the computing devices. In an example, the online multiplayer gaming system comprises four computing devices associated with respective four users namely Player1, Player2, Player3 and Player4 engaged in a game play. Herein, the execution speed of the one or more first objects in each of the four computing devices is changed to the second execution speed, when a selection of the second object is detected on any one of the four computing devices. In other words, the execution speed of the one or more first objects is changed to the second execution speed, when at least one of the four players perform a selection of the second object. In such a case, the server sends a synchronization signal to each of the clocks associated with respective computing devices to change the execution speed of the one or more first objects to the second execution speed. Notably, the one or more actions of the first objects in each of the computing devices are slowed down, or the actions are performed in a slow motion.

The computer implemented method further comprises changing the execution speed of the one or more first objects in the game play on each of the computing devices upon detection of absence of selection of the second object on each one of the computing devices. In an example (as above), the online multiplayer gaming system comprises four computing devices associated with respective four users namely Player1, Player2, Player3 and Player4 engaged in a game play. Herein, the execution speed of the one or more first objects in each of the four computing devices is changed to the first execution speed, when the absence of selection of the second object is detected on each of the four computing devices. In other words, the execution speed of the one or more first objects is changed to the first execution speed, when none of the players are performing the selection operation of the second objects. In such a case, the server sends a synchronization signal to each of the clocks associated with respective computing devices to change the execution speed of the one or more first objects to the first execution speed. Notably, the one or more actions of the first objects in each of the computing devices are restored to a normal speed, when none of the players have selected the second object.

The present disclosure also relates to the method as described above. Various embodiments and variants disclosed above apply mutatis mutandis to the method.

Optionally, the at least one processor is further configured to change the execution speed of the one or more first objects to the first execution speed, upon detecting a de-selection of the second object.

Optionally, the computing device further comprises a first clock configured to be operated at a first speed and a second clock configured to be operated at a second speed. Herein, the first execution speed is synchronized with the first clock and the second execution speed is synchronized with the second clock.

Optionally, the second speed of the second clock is slower than the first speed of the first clock.

Optionally, the second speed of the second clock is 2-10 times slower than the first speed of the first clock.

Optionally, the display is a touch sensitive display configured to detect a contact of the pointer device thereon.

Optionally, the second object is configured to be selected when the pointer device is in contact with the display in the second area and the second object is configured to be dragged along the display to the first area while the contact is maintained. Herein, the second object is configured to be released when the contact with pointer device is terminated in the first area.

Optionally, the game play is a strategy-based game play.

Optionally, the first area comprises a third area and a fourth area. Herein, the second area is configured to display the second object for selection, the selected second object is configured to be deployed in the third area upon detection of the de-selection of the selected second object, and the one or more first objects are configured to be presented in the fourth area.

Optionally, the third area is a home base area comprising a headquarter to manage the second object, a lab to upgrade one or more skills of the second object, and a transportation unit to move the second object from the third area to the fourth area.

Optionally, the one or more first objects comprise one or more of enemy troops, enemy weapons, enemy bases and enemy tools, and wherein the second object is a resource for performing an operation on the one or more first objects and comprise at least one of a soldier, a troop unit, a weapon system, a transport system, an aid, and a power enhancement tool.

Optionally, the at least one processor is further configured to render a start button on the display in response to detection of a deployment of the second object in the third area.

Optionally, the at least one processor is configured to detect a selection of the start button by the pointer device on the display and move the deployed second object from the third area to the fourth area with the first execution speed in response to the detection of the selection of the start button.

Optionally, the at least one processor is further configured to:
synchronize the one or more actions of the one or more first objects with a first clock operating at a first speed corresponding to the first execution speed;
synchronize the one or more actions of the one or more first objects with a second clock operating at a second speed corresponding to the second execution speed for a duration of the detection of the selection of the second object; and
re-synchronize the one or more actions of the one or more first objects with the first clock in response to the detection of the de-selection of the selected second object in the first area.

Optionally, the at least one processor is further configured to provide a control option on the display to define a ratio of the second execution speed to the first execution speed.

Optionally, the at least one processor is configured to autonomously control the one or more actions of the one or more first objects in the first area.

Optionally, a server is connected to a plurality of computing devices to facilitate an online multiplayer gaming system, wherein the server is configured to:
render the game view concurrently on respective displays of the plurality of computing devices;
coordinate the one or more actions of the one or more first objects in the game play on the plurality of plurality of computing devices via the server.

Optionally, the server is further configured to:
change the execution speed of the one or more first objects in the game play on each of the plurality of computing devices to the second execution speed upon detection of selection of the second object on any one of the plurality of computing devices; and
change the execution speed of the one or more first objects in the game play on each of the plurality of computing devices upon detection of an absence of the selection of the second object on any one of the plurality of computing devices.

DETAILED DESCRIPTION OF THE DRAWINGS

Referring to FIG. 1, there is shown a schematic illustration of a block diagram of a computing device 100, in accordance with an embodiment of the present disclosure. As illustrated, the computing device 100 comprises a display 102, a processing unit 104 and a communication bus 106. The display 102 is communicatively coupled to the processing unit 104 via the communication bus 106. As shown, the display 102 display 102 provides a user interface for rendering graphical elements, objects, game view and so forth. Notably, the display 102 is touch sensitive to receive a user-input from a pointer device (not shown). As shown, a first area 110 and a second area 112 is displayed on the user interface of the computing device 100. The first area 110 displays one or more first objects 114 performing one or more actions. The second area 112 is located under the first area 110 and is displayed on the computing device 100. The second area 112 displays second objects 116 positioned therein. Herein, the pointer device is utilized by the user to select the second object 116 from the second area 112 and deploy the second object 116 in the first area 110.

Figure 2:
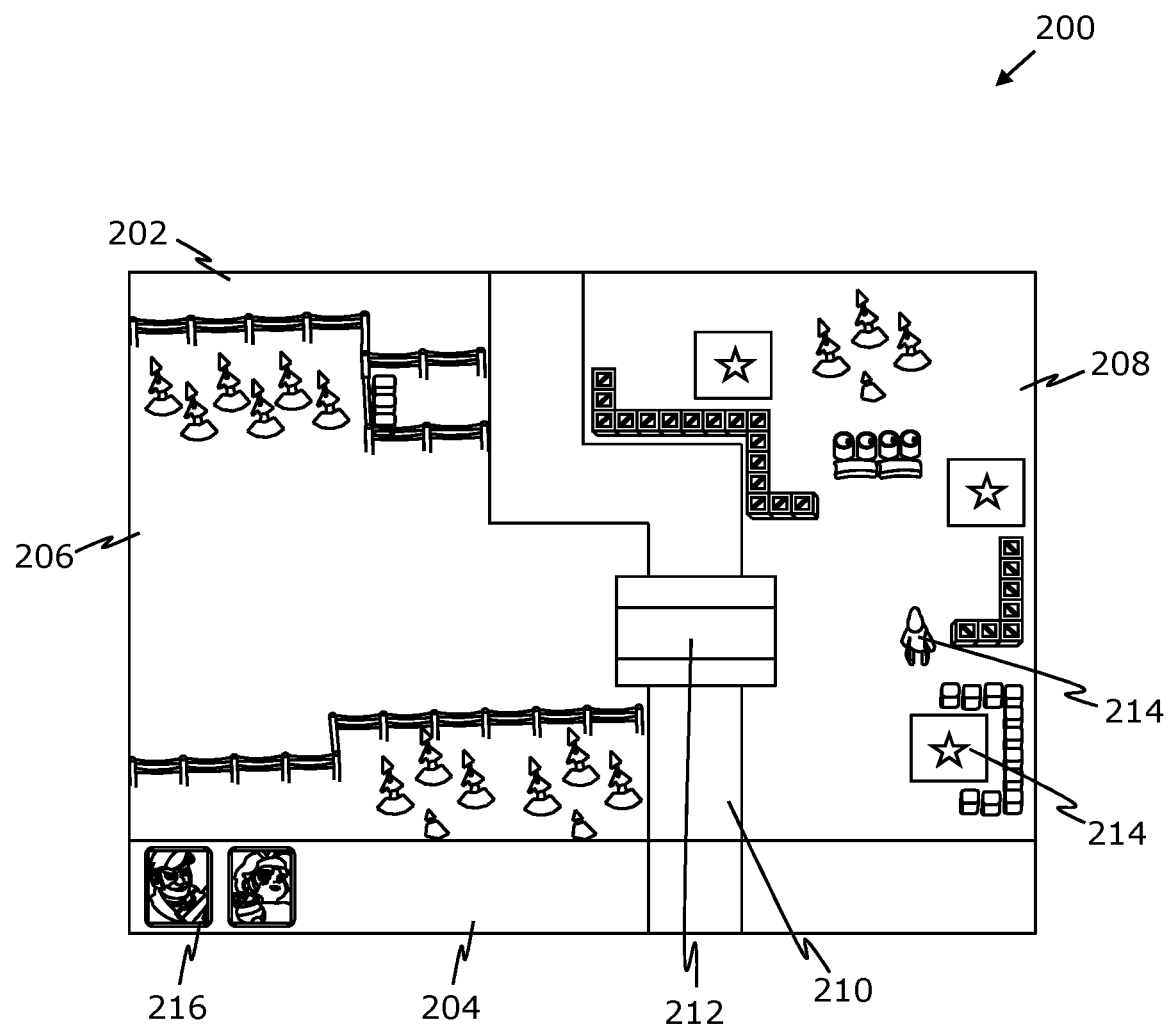
FIG. 2 is a graphical representation of a game view as would be rendered on a graphical user interface associated with a display of the computing device, in accordance with an embodiment of the present disclosure.

Referring to FIG. 2, there is shown a graphical representation of a game view 200 as would be rendered on a graphical user interface associated with a display (such as the display 102 of FIG. 1) of the computing device (such as the computing device 100 of FIG. 1), in accordance with an embodiment of the present disclosure. As illustrated, the game view 200 comprises a first area 202 and a second area 204. The first area 202 further comprises a third area 206 and a fourth area 208 partitioned by an obstacle. Herein the third area 206 and the fourth area 208 are separated into two distinct areas by obstacles like a river 210, and a bridge 212 is provided to connect the third area 206 and the second area

208. Further, the fourth area 208 displays one or more first objects 214 positioned in the fourth area 208 for defending an attack and performing one or more actions with a first execution speed. As shown, the second area 202 displays second objects 216. The third area 206 is a playing field where the second object 216 is deployed. The second object 216 is selected from the second area 202 and dragged to be deployed in the third area 206. Further, after the release of the second object 216 in the third area 206, the second object 216 moves from the third area 206 to the fourth area 208 via the bridge 212 with the first execution speed.

Figure 3:
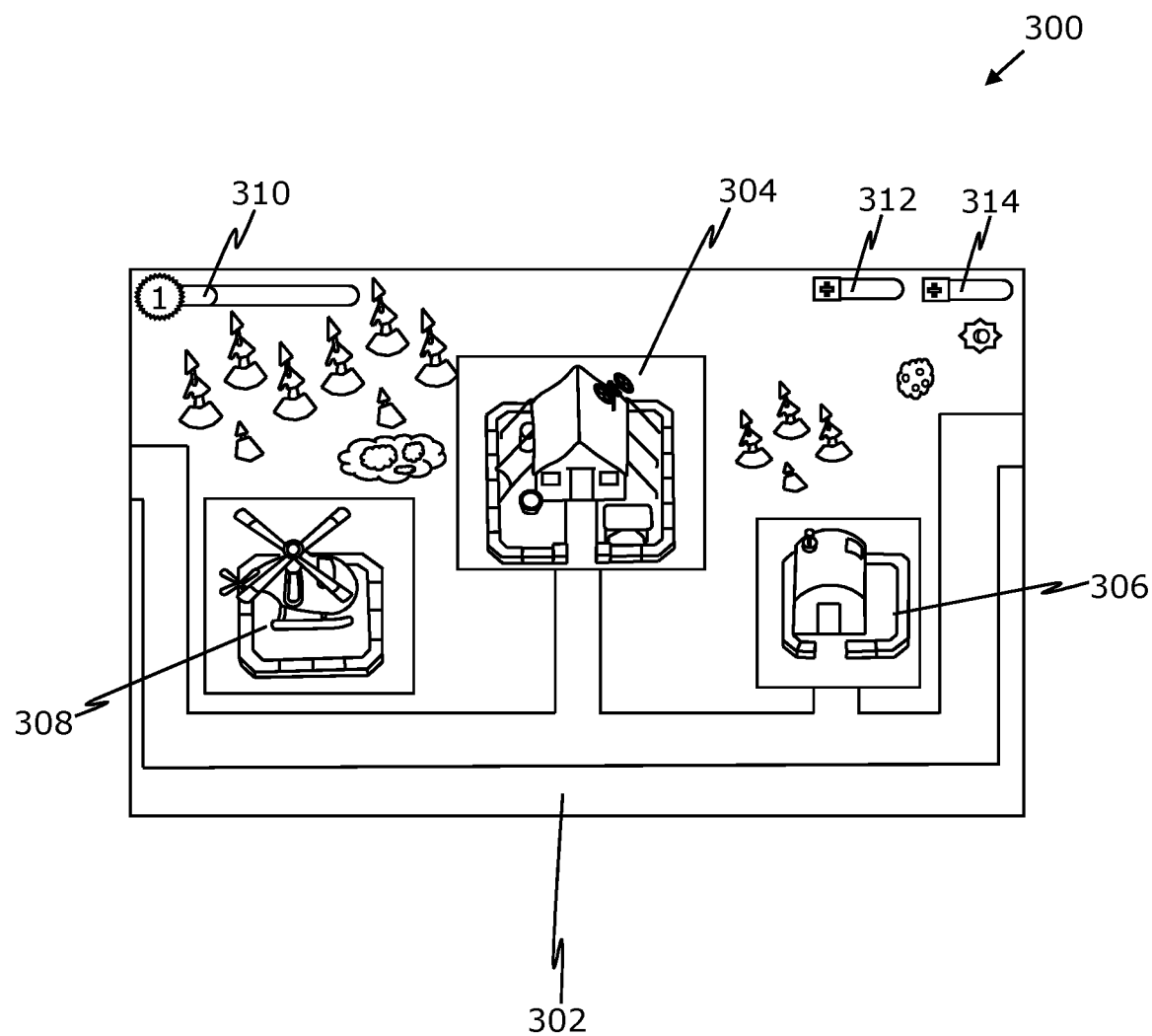
FIG. 3 is a graphical representation of a game view around a home base area in a first area as would be rendered on a graphical user interface associated with the display of the computing device, in accordance with an embodiment of the present disclosure.

Referring to FIG. 3, there is shown a graphical representation of a game view of a home base area 300 in a first area (such as the first area 202 of FIG. 1) as would be rendered on a graphical user interface associated with the display (such as the display 102 of FIG. 1) of the computing device (such as the computing device 100 of FIG. 1), in accordance with an embodiment of the present disclosure. As illustrated, the graphical user interface depicts the home base area 300 of a user wherein the game view 300 comprises a headquarter 304 for managing a second object, a lab 306 for upgrading one or more skills of the second object and a transportation unit 308 for moving the second object from the third area to the fourth area. The home base area 300 further comprises information indicators such as a first indicator 310 for displaying a name and a current rank of the user in the game play, a second indicator 312 for displaying total number of awards collected, and a third indicator 314 for displaying a total number of coins collected in the game play. Furthermore, a pointer device (not shown) can be utilized to select the graphical representation for the headquarter 304, the lab 306 and the transportation unit 308 to further depict characteristics and capabilities by presenting a new popup window.

Figure 4A:
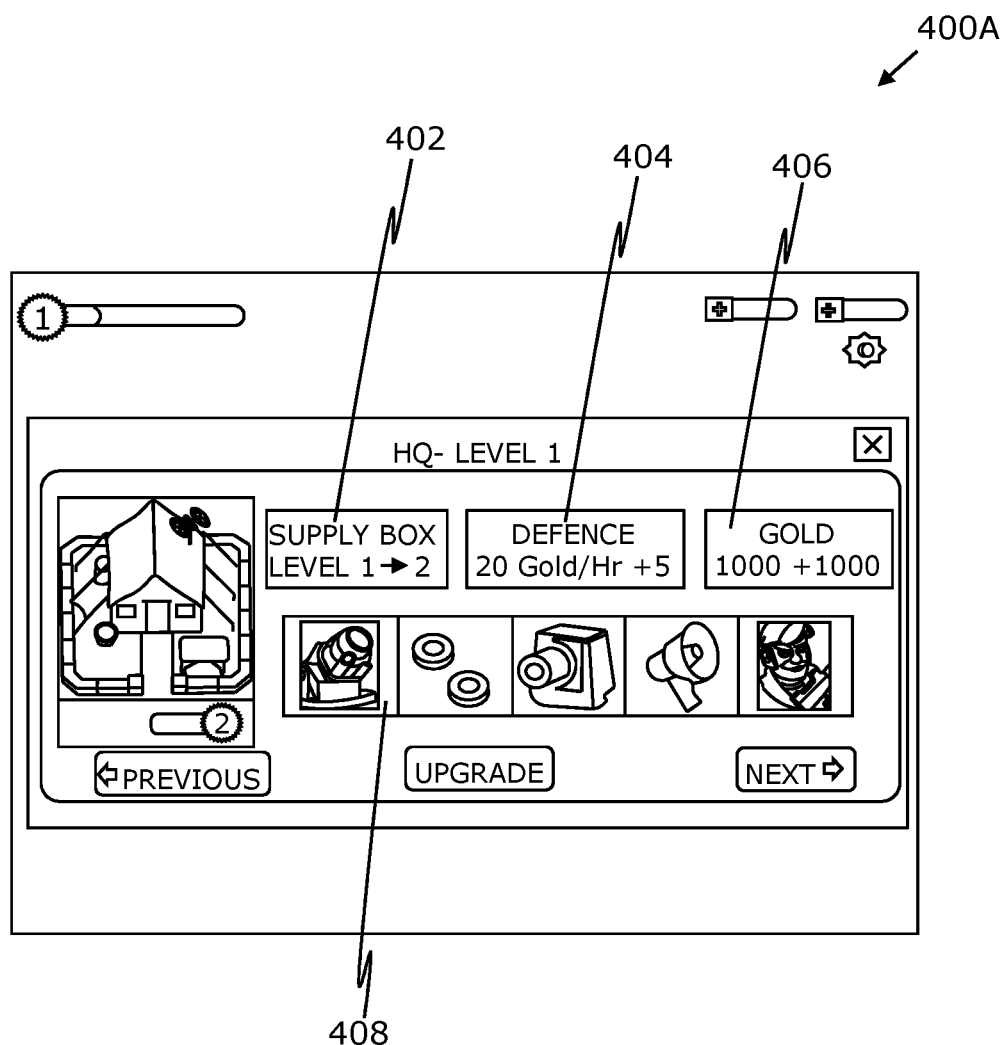
FIG. 4A is a graphical representation of an exemplary headquarter of FIG. 3 depicted as a headquarter popup window as would be rendered on a graphical user interface associated with the display of the computing device, in accordance with an embodiment of the present disclosure.

Referring to FIG. 4A, there is shown a graphical representation of an exemplary headquarter of FIG. 3 depicted as a headquarter popup window 400A as would be rendered on a graphical user interface associated with the display (such as the display 102 of FIG. 1) of the computing device (such as the computing device 100 of FIG. 1), in accordance with an embodiment of the present disclosure. As illustrated, the headquarter popup window 400A comprises a plurality of indicators such as a first indicator 402 depicting a current level of the supply box residing inside the headquarters, a second indicator 404 depicting defense production parameter showing a current gold production rate and a third indicator 406 depicting gold storage parameter indicating a storage capability of the gold storage in the headquarters. Furthermore, the headquarter popup window 400A displays available playing cards 408 of the second object that can be managed by the user by selecting second objects to be displayed in the second area. The headquarter popup window 400A also displays upcoming locked second objects that need to be unlocked in the subsequent levels as the game progresses.

Figure 4B:
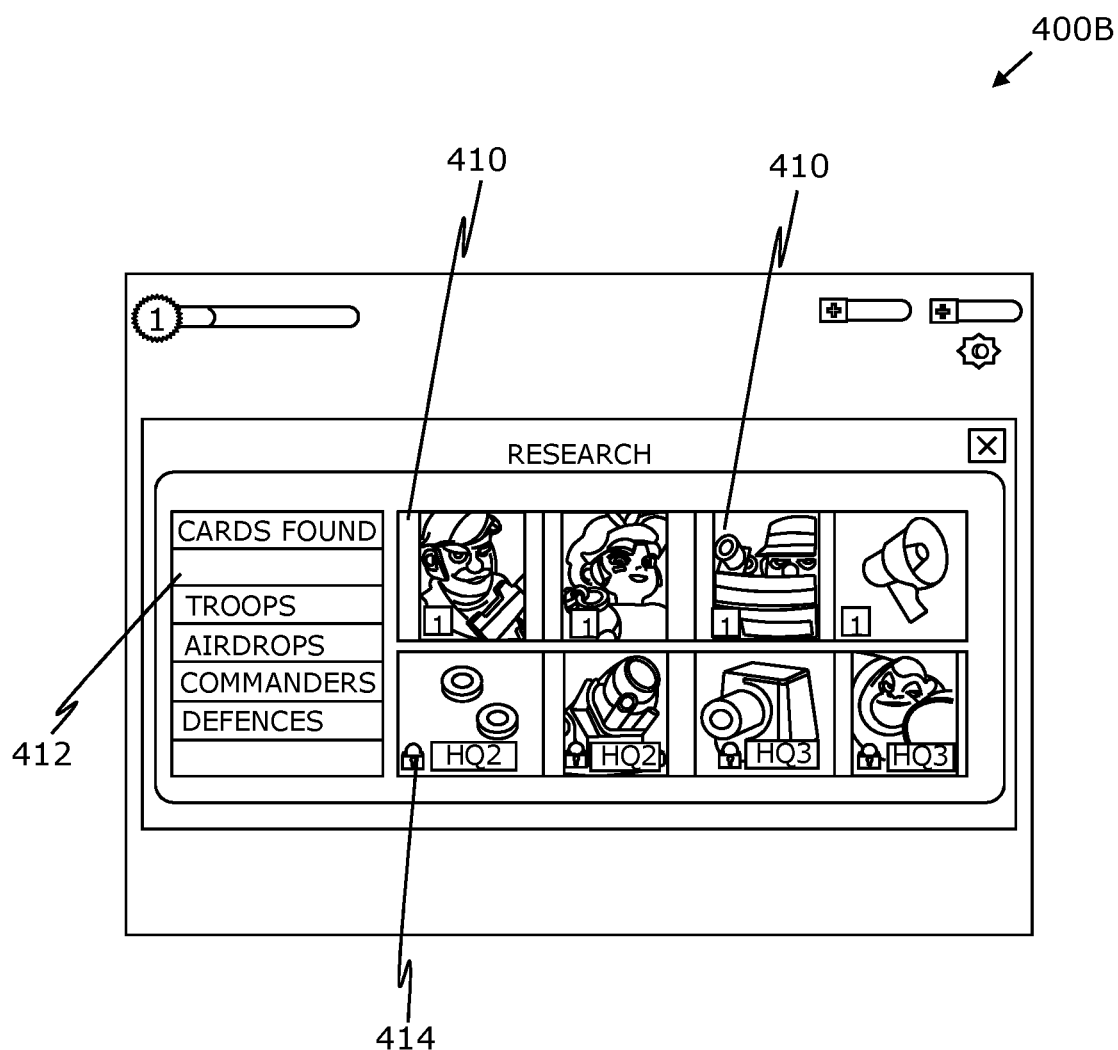
FIG. 4B is a graphical representation of an exemplary lab of FIG. 3 depicted as a lab popup window as would be rendered on a graphical user interface associated with the display of the computing device, in accordance with an embodiment of the present disclosure.

Referring to FIG. 4B, there is shown a graphical representation of an exemplary lab of FIG. 3 depicted as a lab popup window 400B as would be rendered on a graphical user interface associated with the display (such as the display 102 of FIG. 1) of the computing device (such as the computing device 100 of FIG. 1), in accordance with an embodiment of the present disclosure. As illustrated, the lab popup window 400B display a number of second objects 410, such as soldiers, troop units, weapon systems, medical aids, tools and the like depicted as playing cards that can be upgraded to possess higher skills as the game progresses. Herein, each of the second object 410 depicted in the playing card possess a particular level of skill set which can be upgraded as desired by the user utilizing a number of awards collected by the user during the game play. Further, different categories of the second object are displayed on a menu 412. Herein, each category of the second objects 410 objects can upgraded to a further level relative to present level, in the lab. These second objects 410 are found/unlocked by completing various missions and objectives and upgradation of the headquarters (such as object 402). As shown, the unlocked playing cards are unavailable for selection as depicted through a locked sign 414 referring to the unavailability of the playing card selection.

Figure 4C:
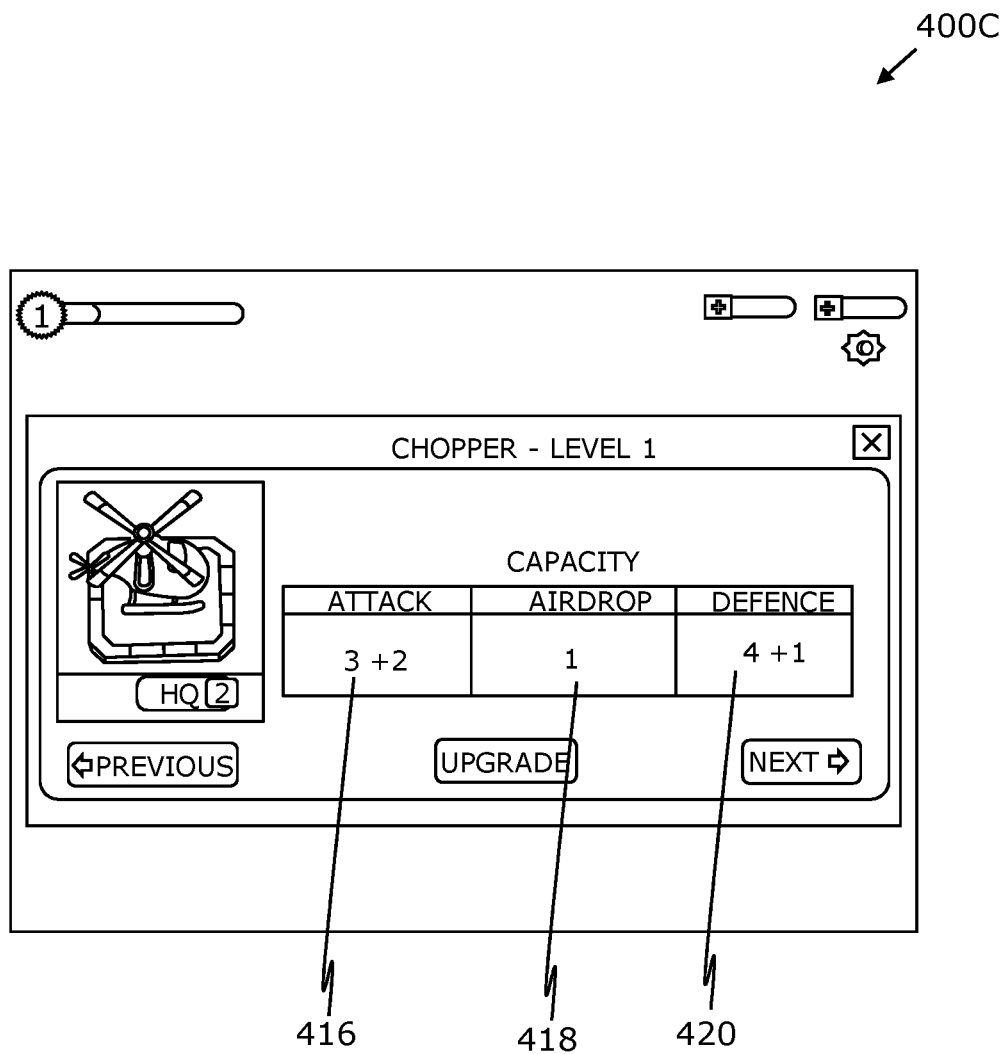
FIG. 4C is a graphical representation of an exemplary transportation unit of FIG. 3 depicted as a transportation unit popup window as would be rendered on a graphical user interface associated with the display of the computing device, in accordance with an embodiment of the present disclosure.

Referring to FIG. 4C, there is shown graphical representation of an exemplary transportation unit of FIG. 3 depicted as a transportation unit popup window 400C as would be rendered on a graphical user interface associated with the display (such as the display 102 of FIG. 1) of the computing device (such as the computing device 100 of FIG. 1), in accordance with an embodiment of the present disclosure. As illustrated, transportation unit popup window 400C of the transportation unit displays a capacity of the transportation unit. Herein, the transportation unit is a chopper which can be utilized to move second objects such as soldiers, provide airdrops such as medical kits, energy supplied in an enemy area (the fourth area) via aerial route. As shown, the transportation unit popup window 400C displays several indicators depicting an attack capability parameter 416, airdrop capacity parameter 418, and a defense capability parameter 420.

Figure 5A:
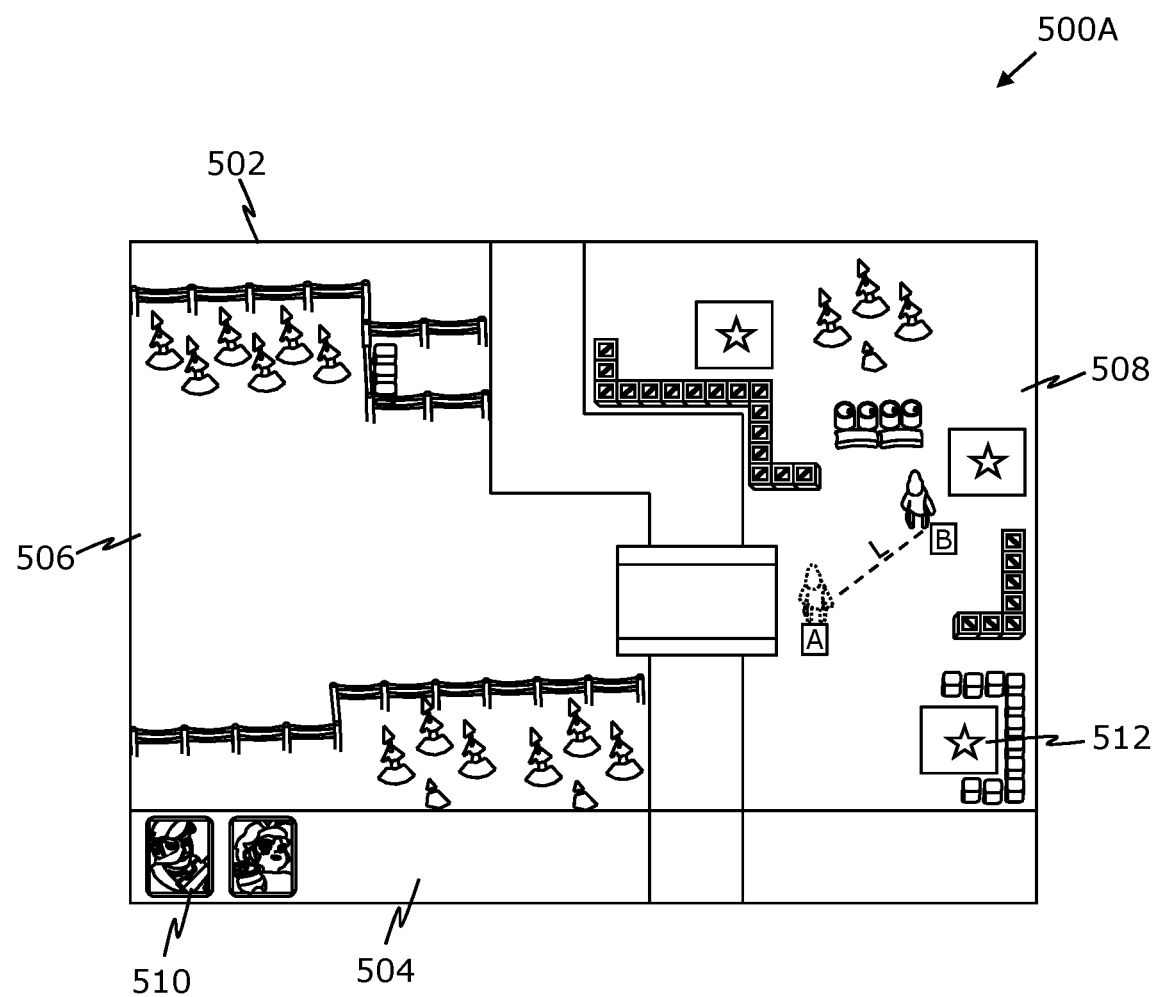
FIGS. 5A-5B are graphical representations of game views comprising a first area and a second area as would be rendered on a graphical user interface associated with the display of the computing device, in accordance with various embodiments of the present disclosure.
Figure 5B:
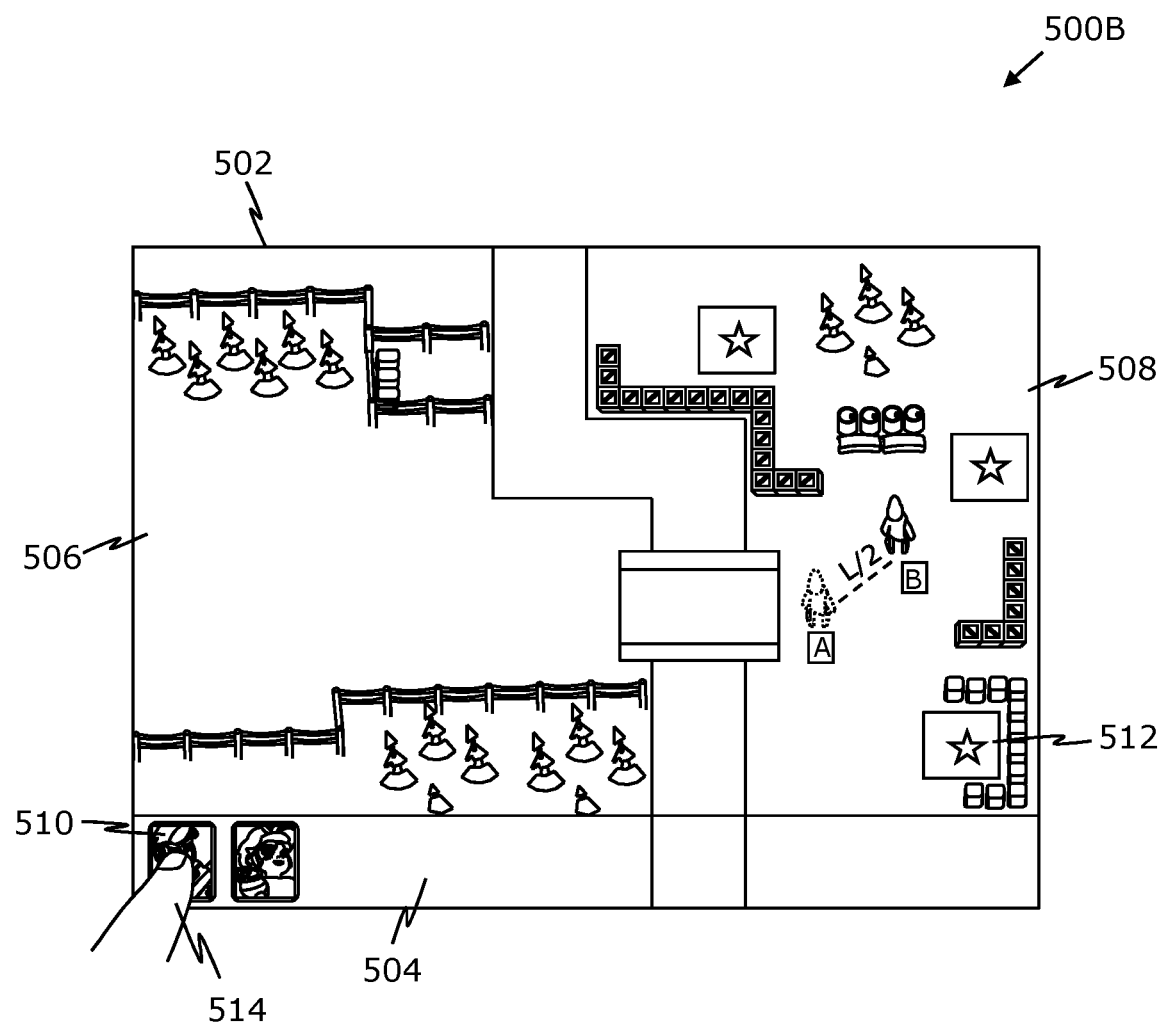

Referring to FIGS. 5A and 5B, there are shown graphical representations of game views 500A and 500B comprising a first area (such as the first area 202 of FIG. 2) and a second area (such as the second area 204 of FIG. 2) as would be rendered on a graphical user interface associated with the display (such as the display 102 of FIG. 1) of the computing device (such as the computing device 100 of FIG. 1), in accordance with various embodiments of the present disclosure. As illustrated, the game views 500A and 500B comprises the first area 502. The first area 502 comprises a third area 506 (such as the third area 206 of FIG. 2) and a fourth area 508 (such as the fourth area 208 of FIG. 2). The second area 504 displays second objects 510 for selection by a user therefrom. The fourth area 508 comprises one or more first objects 512.

As shown in FIG. 5A, the first object 512 performs one or more actions with a first execution speed, when there is no selection of the second object 510 detected. The first object 512 (herein, a soldier) is moved from a first position "A" to a second position "B" in the fourth area covering "L" distance on the display. Herein, the first object 512 covers "L" distance in a duration of 1 second, when no selection of second object 510 is detected. As shown in FIG. 5B, a pointer device 514 selects the second object 510. In such a case, the first object 512 performs one or more actions with a second execution speed. Herein, the second execution speed is half of the first execution speed and therefore the first object 512 perform one or more actions with a slower speed. As shown, the first object 512 is moved from a first position "A" to a second position "B" in the fourth area covering "L/2" distance on the display. Herein, the first object 512 covers "L/2" distance in a duration of 1 second, when selection of the second object 510 is detected.

Referring to FIGS. 6A-6E, there are shown graphical representations depicting steps of selection and release of second object in the game view 600A, 600B, 600C, 600D and 600E as would be rendered on a graphical user interface associated with the display (such as the display 102 of FIG.

1) of the computing device (such as the computing device 100 of FIG. 1), in accordance with various embodiments of the present disclosure. As shown, each of the game views 600A, 600B, 600C, 600D and 600E comprise a second area 602 displaying second objects 604, a third area 606 for deploying second objects 604, and a fourth area 608 comprising one or more first objects 610. Further, there is shown a pointer device 612 for performing user operation on the display.

Figure 6A:
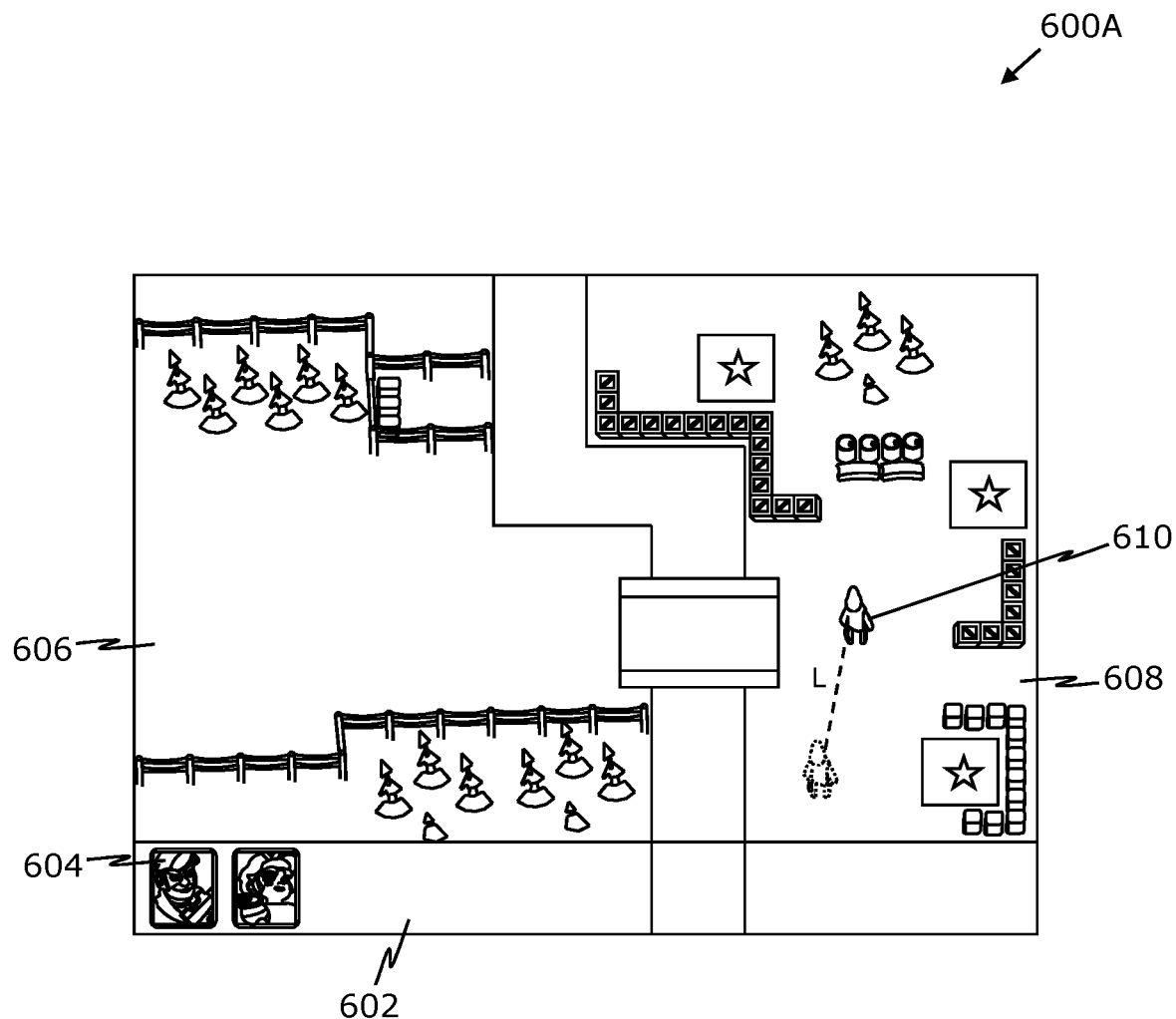
FIGS. 6A-6E are graphical representations depicting steps of selection and release of second object in the game view as would be rendered on a graphical user interface associated with the display of the computing device, in accordance with various embodiments of the present disclosure.
Figure 6B:
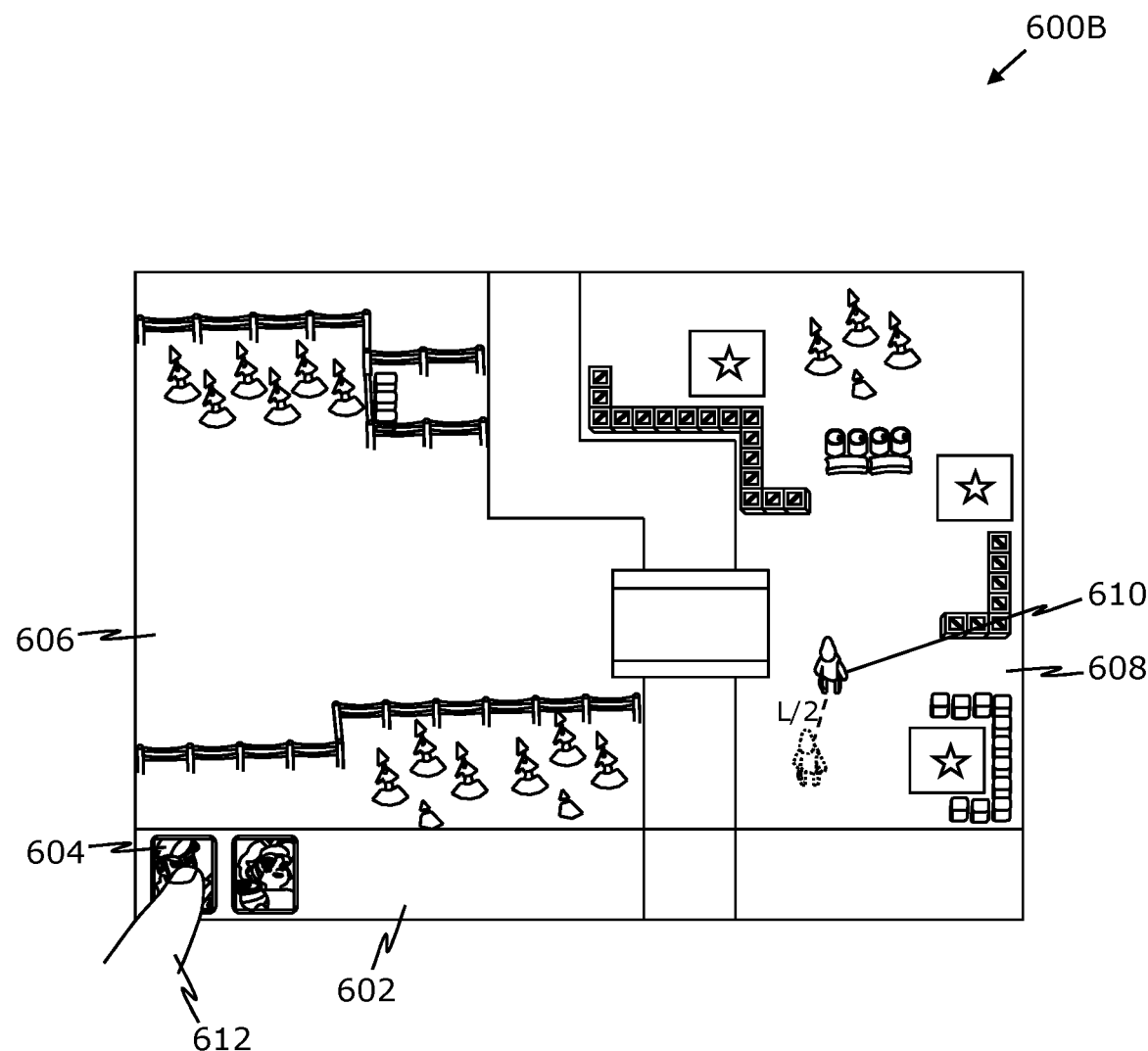
Figure 6C:
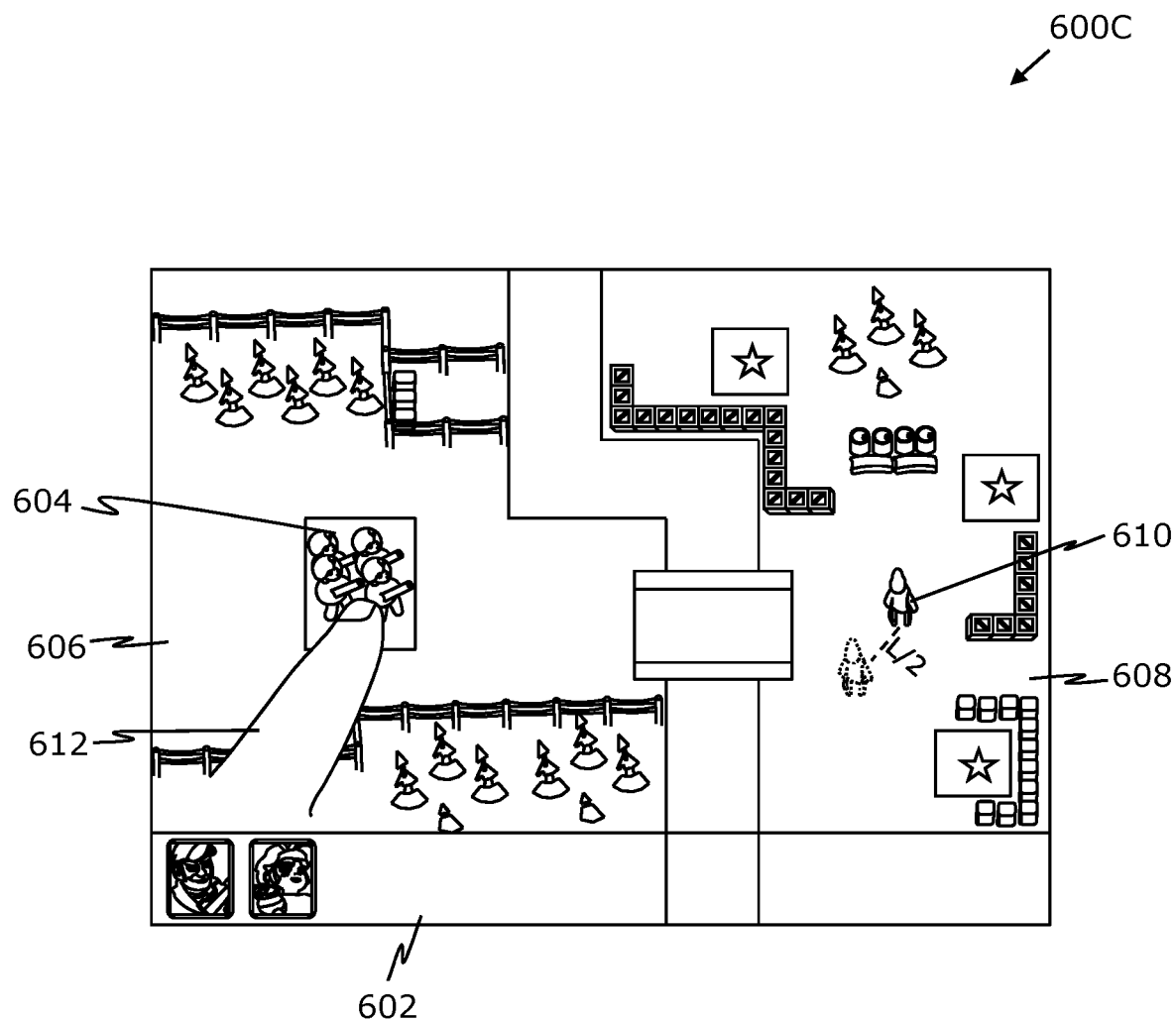
Figure 6D:
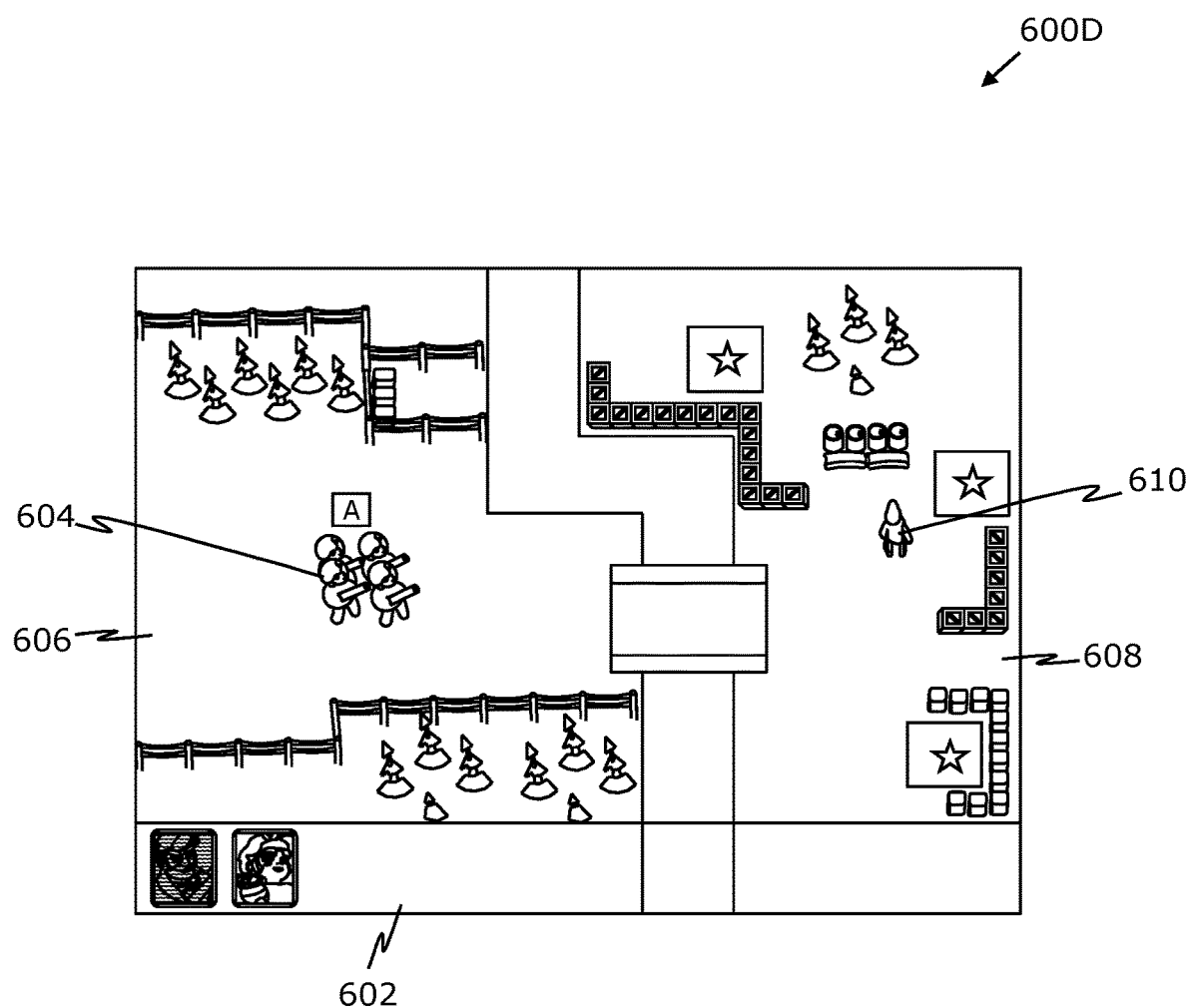
Figure 6E:
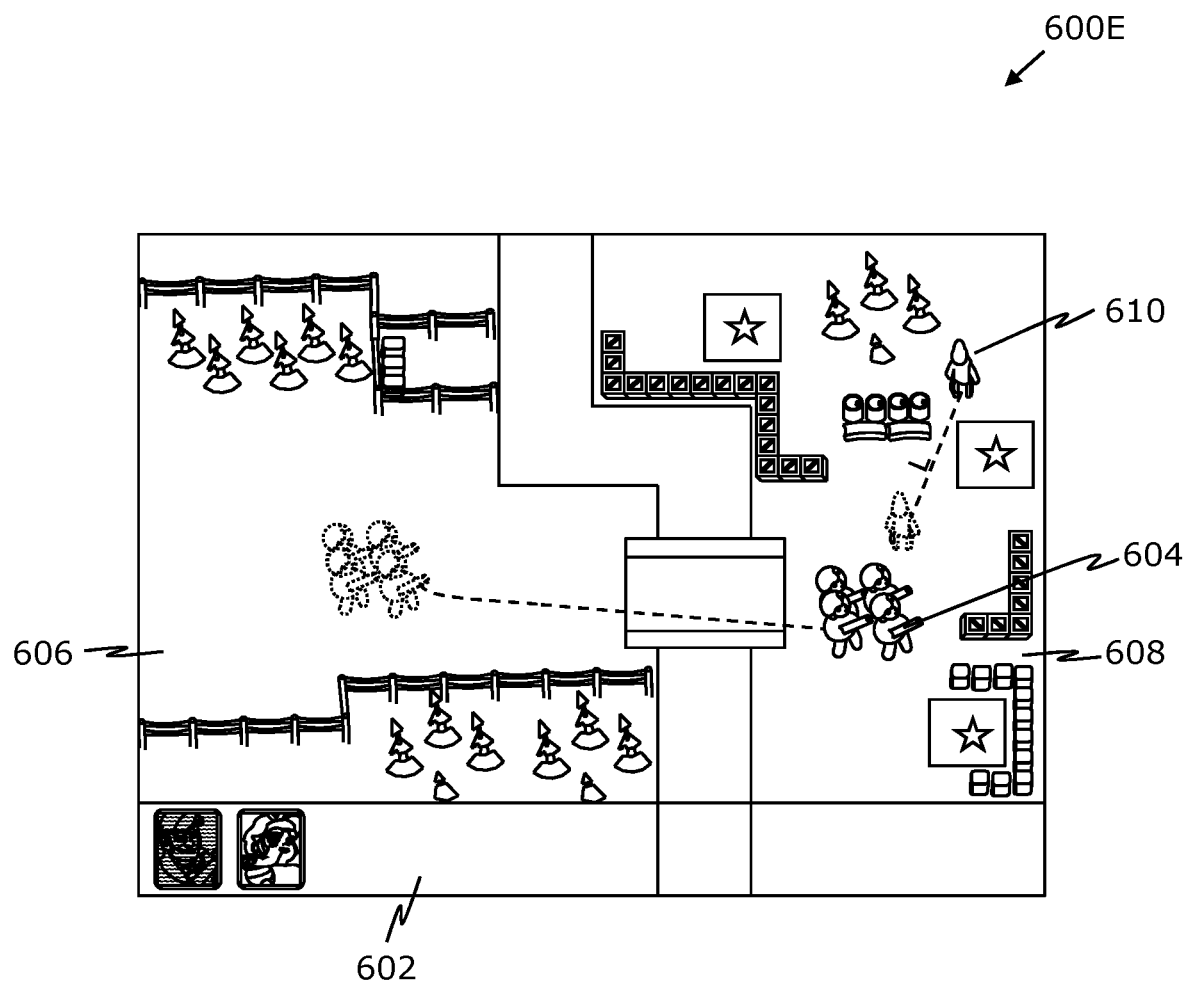

As shown in FIG. 6A, there is no selection of second object 604, and therefore the first object 610 performs one or more actions in the fourth area 608 with a first execution speed. Herein, the first object 610 covers a distance "L" in a duration of 1 second. As shown in FIG. 6B, the second object 604 is selected by the pointer device 612. The execution speed of the one or more actions of the first objects 610 is changed to a second execution speed upon detection of selection of the second object 604 by the pointer device 612 and, therefore the first object 610 performs one or more actions in the fourth area 608 with the second execution speed. Herein, the second object 604 is selected for a duration of 1 second, during this 1 second, the first object 610 covers "L/2" distance in the fourth area 608 with the second execution speed. As shown in FIG. 6C, the second object 604 is dragged from the second area 602 to the third area 606 by the pointer device 612. Herein, the pointer device 612 can be freely dragged in the third area 606 while maintaining a contact with the second object 604 to precisely deploy the second object 604 at a desired position in the third area 606. Notably, while the contact of the pointer device 612 is maintained with the second object 604, the first objects 610 performs one or more actions with the second execution speed. Herein, the dragging of the second object 604 requires 1 second, then the first object 610 covers "L/2" distance in the fourth area with the second execution speed. As shown in FIG. 6D, the second object 604 is released at a particular location "A" in the third area 606. Herein, the execution speed of the one or more actions of the first objects 610 is changed to the first execution speed upon detection of release of the second object 604 by the pointer device 612 in the third area 606 and, therefore the execution speed of the first objects 610 performing one or more actions in the fourth area 608 is changed to the first execution speed. As shown in FIG. 6E, the second object 604 move from third area 606 to the fourth area 608 with the first execution speed de-selection of the second object 604 is detected. Herein, after the release of the second object 604, both the first object 610 and the second object 604 cover a distance "L" in 1 second.

Referring to FIGS. 7A-7G, there are shown graphical representations of steps of placing second objects in the third area (such as the third area 206 of FIG. 2) in the game views 700A, 700B, 700C, 700D, 700E, 700F and 700G as would be rendered on a graphical user interface associated with the display (such as the display 102 of FIG. 1) of the computing device (such as the computing device 100 of FIG. 1), in accordance with various embodiments of the present disclosure. As may be seen, each of the game views 700A, 700B, 700C, 700D, 700E, 700F and 700G comprises a second area 702 displaying second objects 704 and 706, a third area 708 for deploying second objects 704 and 706, and a fourth area 710 comprising one or more first objects 712. Further, there is shown a pointer device 714 for performing user operation on the display.

Figure 7A:
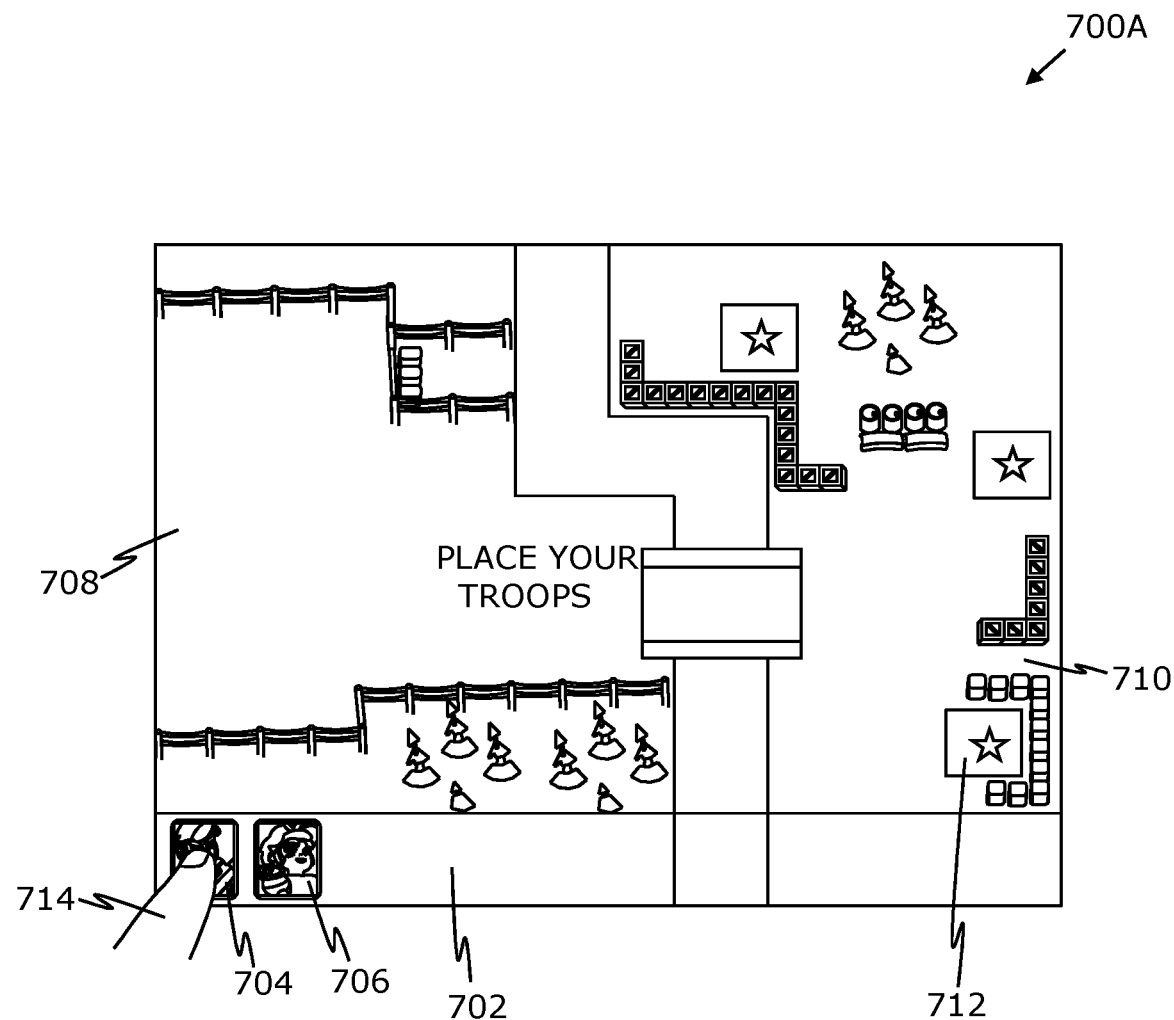
FIGS. 7A-7G are graphical representations of steps of placing second objects in the third area in the game view as would be rendered on a graphical user interface associated with the display of the computing device, in accordance with various embodiments of the present disclosure.
Figure 7B:
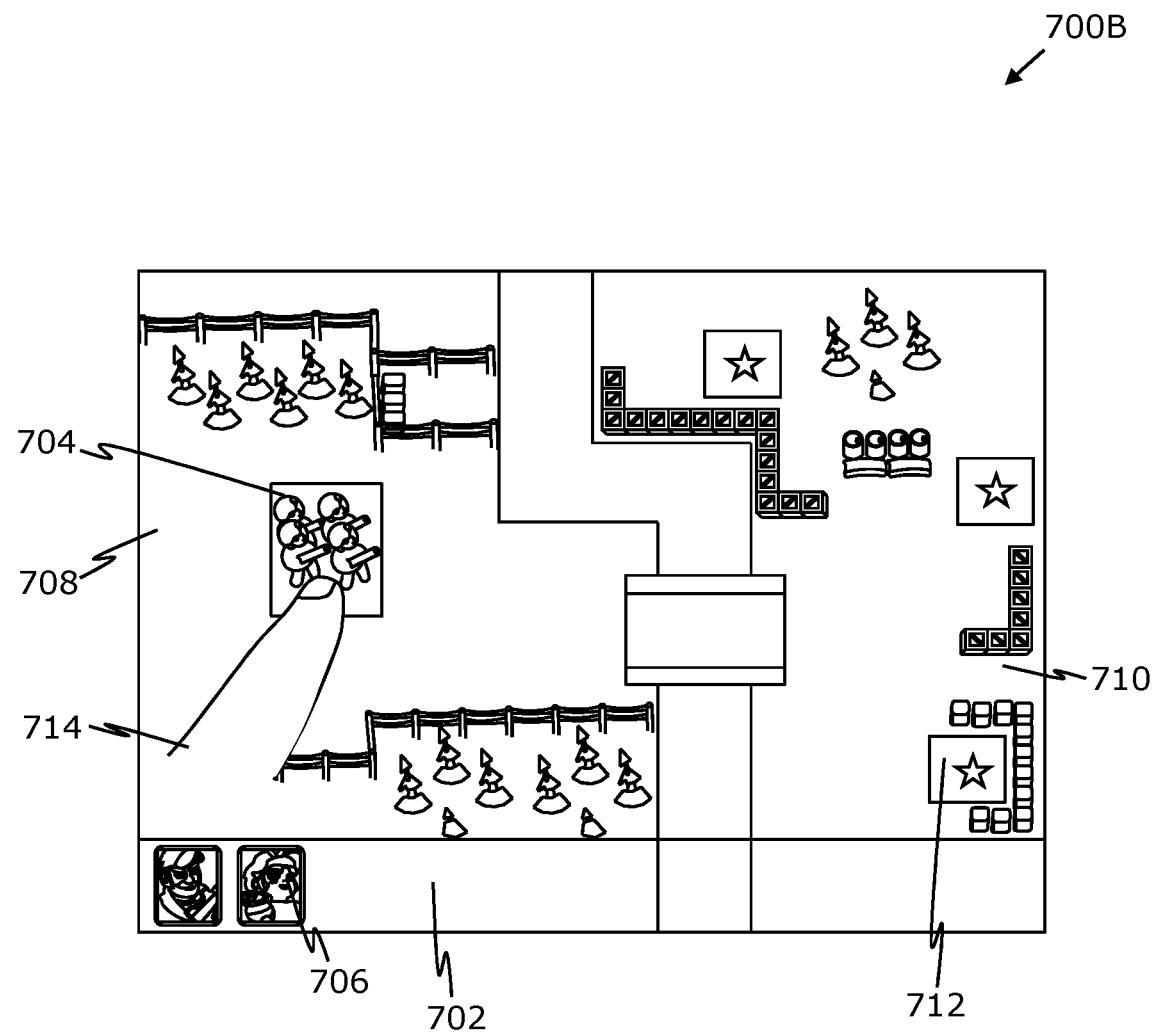
Figure 7C:
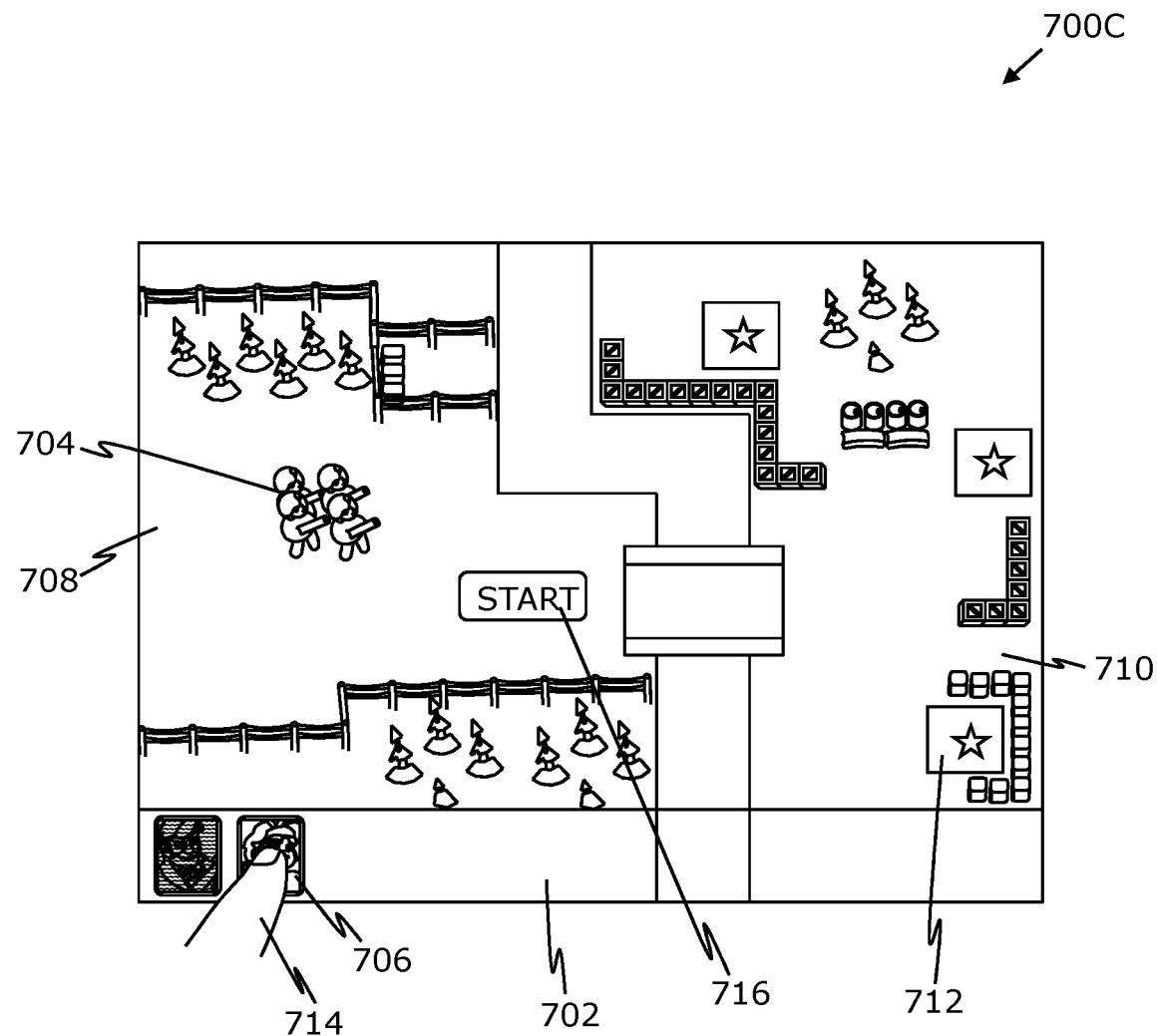
Figure 7D:
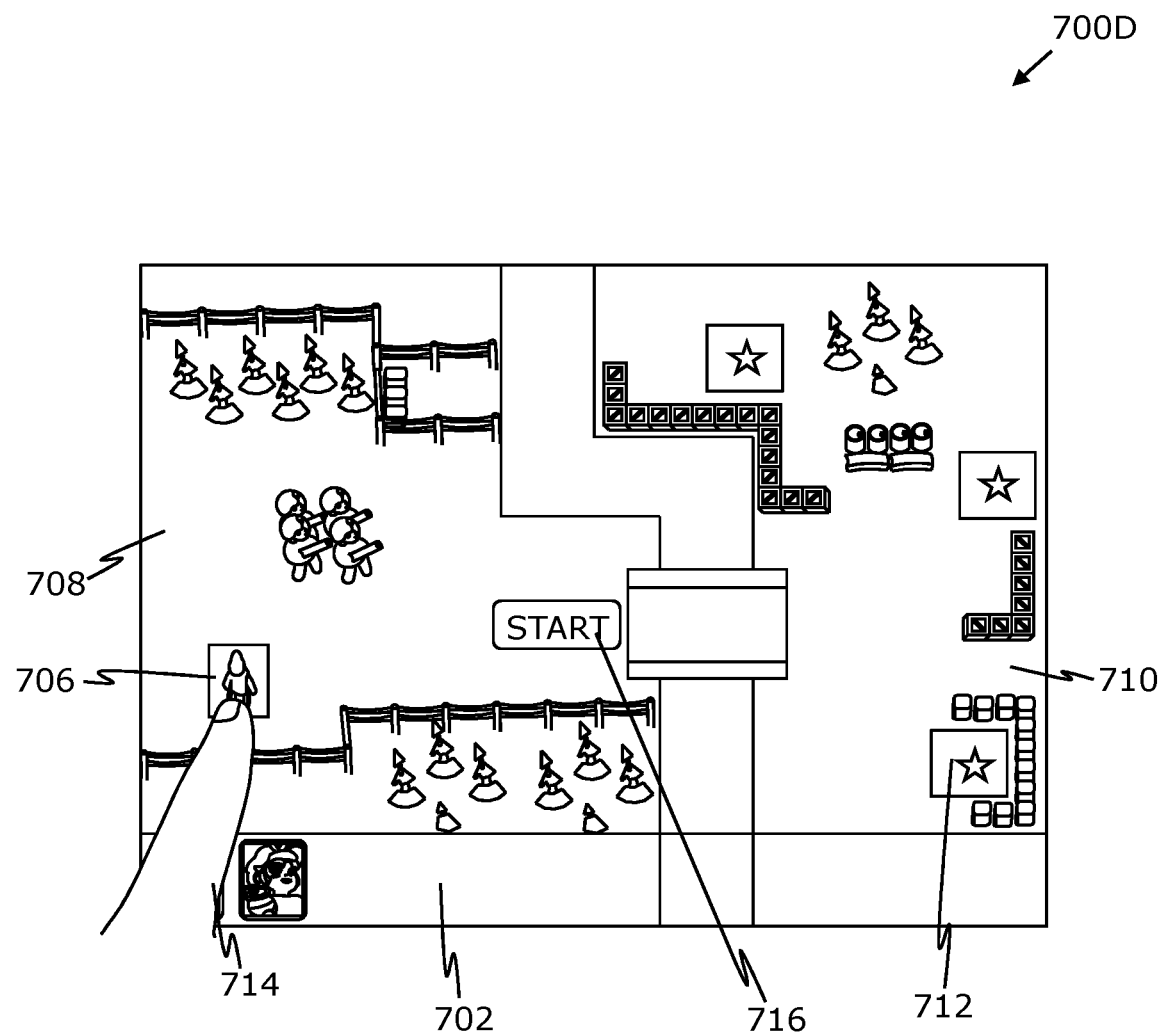
Figure 7E:
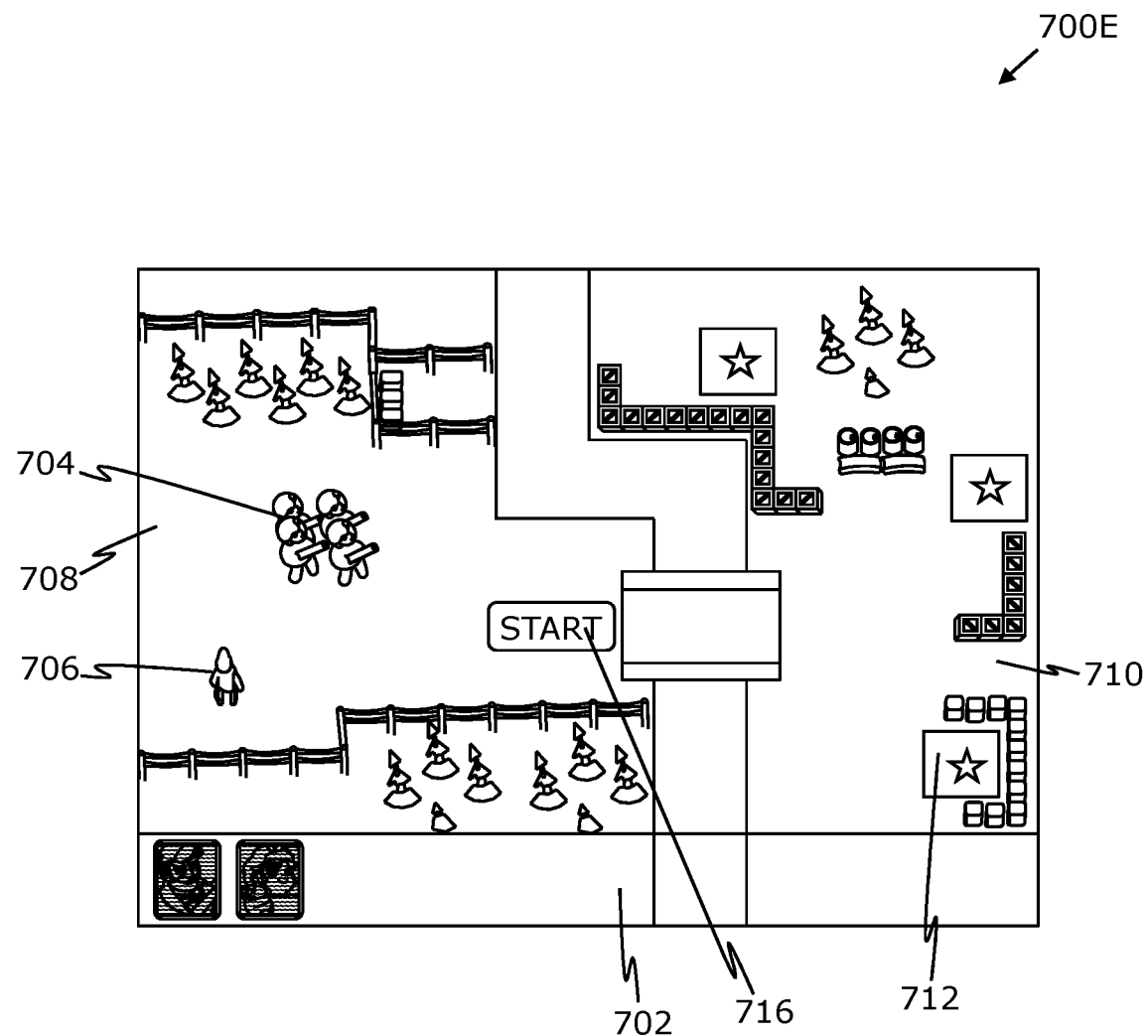
Figure 7F:
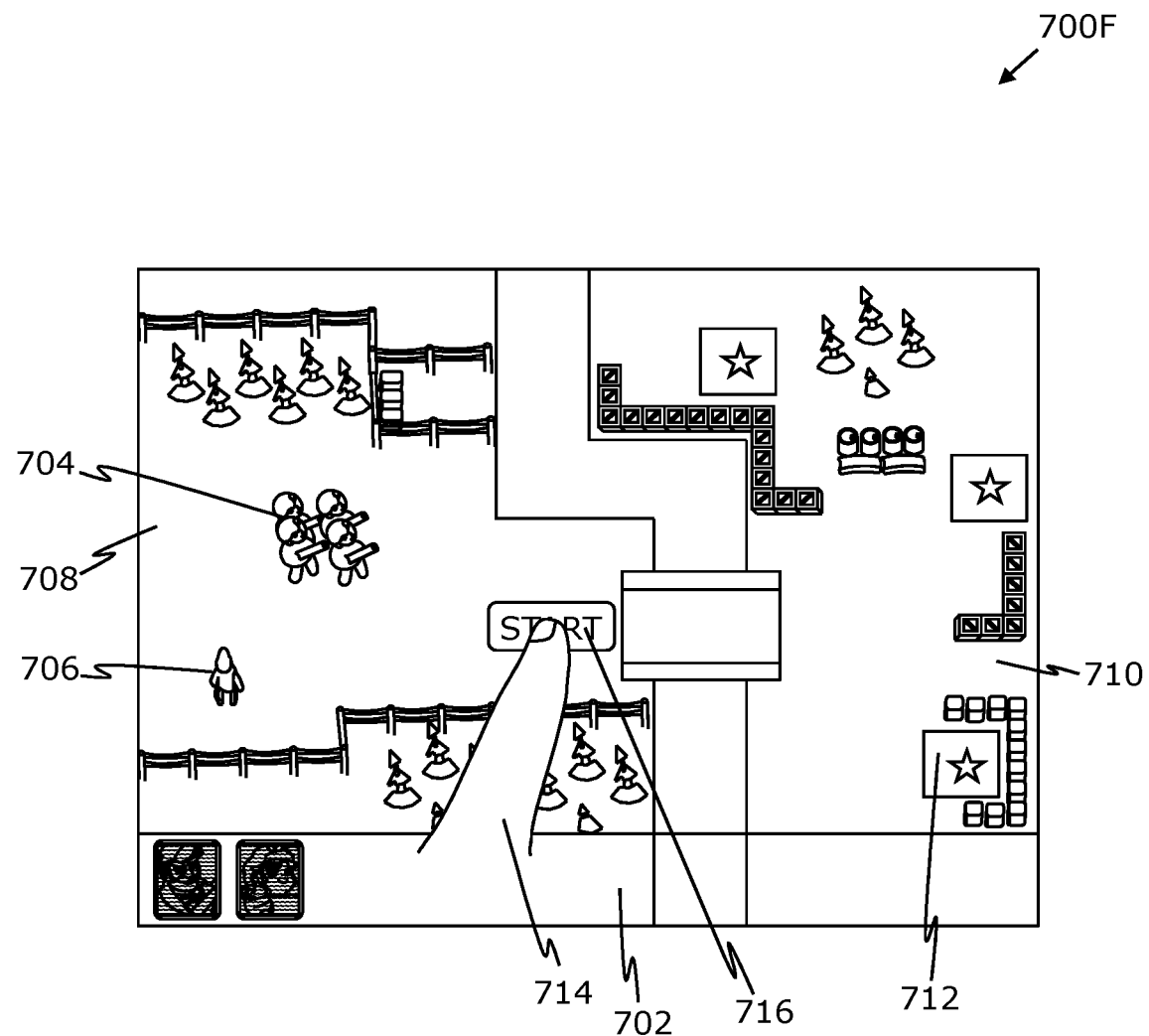
Figure 7G:
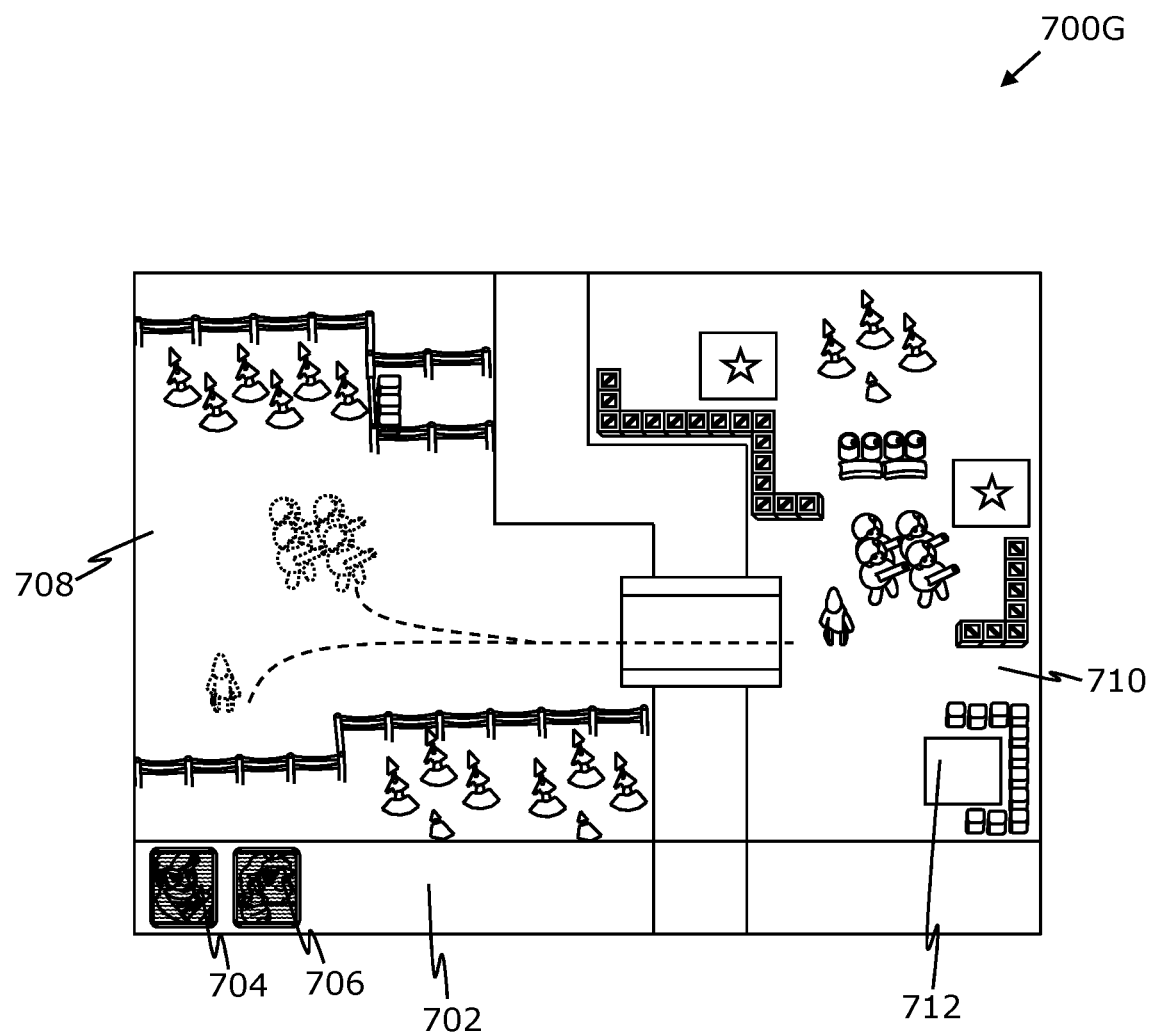

As shown in FIG. 7A, the second object 704 in the second area 702 is selected by the pointer device 714. As shown in FIG. 7B, the second object 704 is moved from the second area 702 to the third area 708 by dragging the pointer device 714 from the second area 702 to the third area 708 while maintaining contact with the second object 704. As shown in FIG. 7C, the second object 704 is released in the third area 708 by terminating the contact between the second object 704 and the pointer device 714. Herein, a "START" button 716 is presented to the user in response to the deployment of the second object 704. Notably, the second object 704 does not move from the position of deployment until the "START" button 716 is pressed. Further, the second object 706 in the second area 702 is selected by the pointer device 714. As shown in FIG. 7D, the second object 706 is moved from the second area 702 to the third area 708 by dragging the pointer device 714 from the second area 702 to the third area 708 while maintaining contact with the second object 704. As shown in FIG. 7E, the second object 706 is released in the third area 708 by terminating the contact between the second object 706 and the pointer device 714. Herein the second object 706 is placed at a different position than the second object 704. Notably, the second objects 704 and 706 do not move until the "START" button 716 is pressed. As shown in FIG. 7F, the "START" button 716 is pressed by the pointer device 714. As shown in FIG. 7G, the second objects 704 and 706 move from the third area 708 to the fourth area 710 with the first execution speed.

Figure 8:
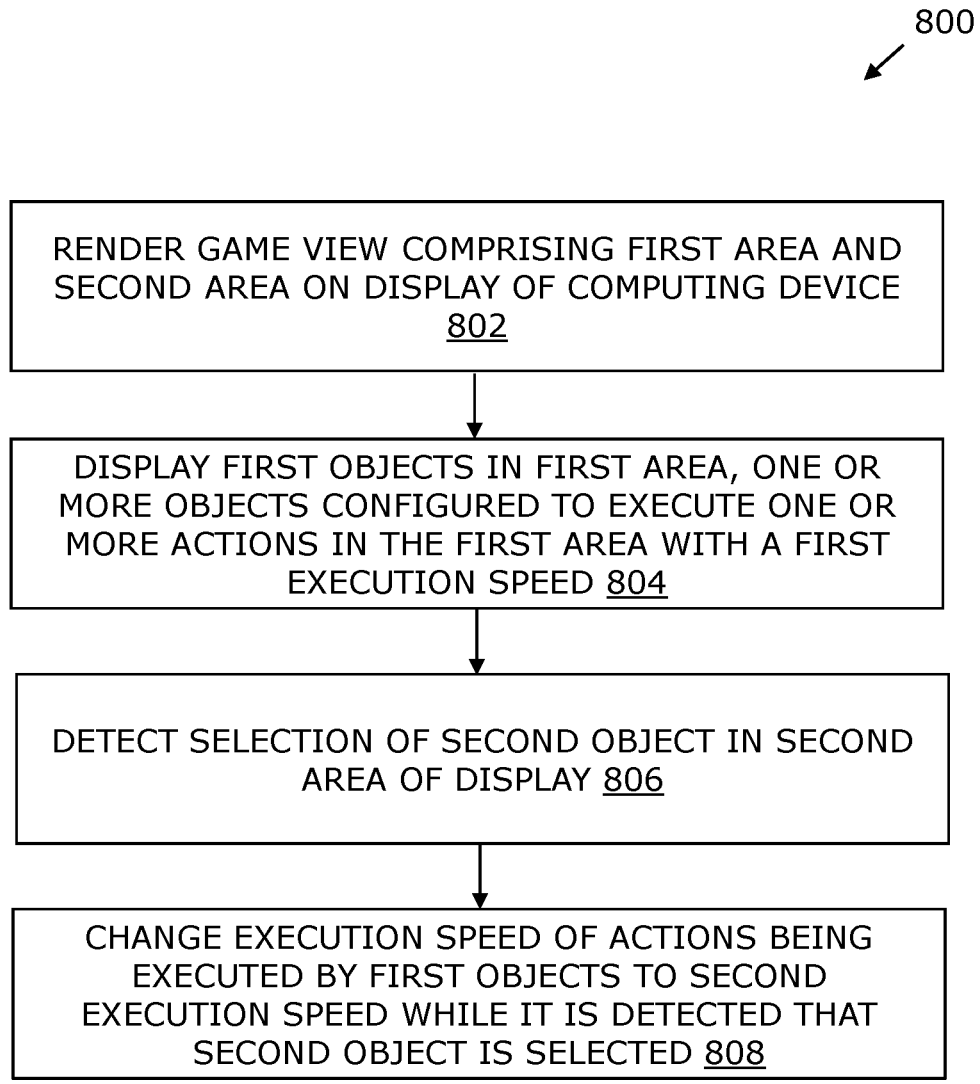
FIG. 8 is a flowchart depicting steps involved in a computer implemented method for controlling a game play, in accordance with an embodiment of the present disclosure.

Referring to FIG. 8, there is shown a flowchart 800 depicting steps of a computer implemented method for controlling a game play, in accordance with an embodiment of the present disclosure. At step 802, a game view comprising a first area and a second area is rendered on a display of a computing device. At step 804, one or more first objects in the first area, the one or more first objects configured to execute one or more actions in the first area are displayed. Herein, the one or more actions are executed at a first execution speed. At step 806, a selection of a second object in the second area of the display is detected. At step 808, the execution speed of the one or more actions being executed by the one or more first objects in the first area is changed to a second execution speed while it is detected that the second object is selected.

The steps 802 to 808 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer implemented method for controlling a game play, the method comprising:
rendering a game view on a display of a computing device, the game view comprising a first area and a second area, wherein the first area further comprises a third area and a fourth area;
causing one or more first objects to be presented in the fourth area and to execute one or more actions in the fourth area at a first execution speed;
detecting a selection of a second object in the second area;

causing the one or more first objects to execute the one or more actions in the fourth area at a second execution speed during the detected selection of the second object responsive to the detected selection of the second object;

detecting a release of the selection of the second object in a third area;

causing the one or more first objects to execute the one or more actions in the fourth area at the first execution speed responsive to the detected release of the selection of the second object;

moving the second object from the third area to the fourth area with the first execution speed;

performing an operation on the one or more first objects with the second object in the fourth area.

2. The computer implemented method according to claim 1, wherein the second execution speed is different from the first execution speed.

3. The computer implemented method according to claim 1, wherein the second object is configured to be selected by contacting a pointer device on the display at the second object in the second area and dragging the pointer device with the second object to the third area while maintaining the contact of the pointer device on the display with the second object, and wherein a de-selection of the second object comprises terminating the contact of the pointer device on the display with the second object in the third area.

4. The computer implemented method according to claim 1, further comprising rendering a start button on the display after detecting the release of the selection of the second object in the third area and moving the second object to the fourth area after a selection of the start button.

5. The computer implemented method according claim 4, further comprising moving at least one other second object into the third area while the start button is rendered.

6. The computer implemented method according to claim 1 further comprising:

synchronizing the one or more actions of the one or more first objects with a first clock operating at a first speed corresponding to the first execution speed;

synchronizing the one or more actions of the one or more first objects with a second clock operating at a second speed corresponding to the second execution speed for a duration of the detected selection of the second object; and re-synchronizing the one or more actions of the one or more first objects with the first clock in response to detecting the de-selection of the selected second object.

7. The computer implemented method according to claim 1 further comprising providing a control option on the display that when selected is configured to define a ratio of the second execution speed to the first execution speed.

8. The computer implemented method according to claim 1 further comprising:

connecting a plurality of computing devices to a server to facilitate an online multiplayer gaming system;

rendering the game view concurrently on respective displays of the plurality of computing devices;

coordinating the one or more actions of the one or more first objects in the game play on the plurality of computing devices via the server;

changing the first execution speed of the one or more first objects in the game play on each of the plurality of computing devices to the second execution speed upon detection of a selection of the second object on any one of the plurality of computing devices; and changing the second execution speed of the one or more first objects in the game play to the first execution speed on each of the plurality of computing devices upon detection of the de-selection of the second object.

9. A computing device for controlling game play, the computing device comprising:

a display; and a processing unit comprising at least one processor, the at least one processor being configured to:

render a game view on the display, the game view comprising a first area and a second area, wherein the first area further comprises a third area and a fourth area;

cause one or more first objects to be presented in the fourth area and to execute one or more actions in the fourth area at a first execution speed;

detect a selection of a second object in the second area;

cause the one or more first objects to execute the one or more actions in the fourth area at a second execution speed during the detected selection of the second object responsive to the detected selection of the second object;

detect a release of the selection of the second object in a third area;

cause the one or more first objects to execute the one or more actions in the fourth area at the first execution speed responsive to the detected release of the selection of the second object;

move the second object from the third area to the fourth area with the first execution speed; and perform an operation on the one or more first objects with the second object in the fourth area.

10. The computing device according to claim 9, wherein the second execution speed is different from the first execution speed.

11. The computing device according to claim 10, wherein the second object is configured to be selected by detecting a contact of a pointer device on the display at the second object in the second area and a dragging of the pointer device to the third area while maintaining the contact of the pointer device on the display with the second object, and wherein upon detection of a de-selection of the second object by the at least one processor is configured to terminate the contact of the pointer device on the display with the second object in the third area.

12. The computing device according to claim 10, wherein the at least one processor is further configured to render a start button on the display after detecting the release of the selection of the second object in the third area and moving the second object to the fourth area after a selection of the start button.

13. The computing device according to claim 12, the at least one processor being further configured to move at least one other second object into the third area while the start button is rendered.

14. The computing device according to claim 10, the at least one processor being further configured to:

synchronize the one or more actions of the one or more first objects with a first clock operating at a first speed corresponding to the first execution speed;

synchronize the one or more actions of the one or more first objects with a second clock operating at a second speed corresponding to the second execution speed for a duration of the detected selection of the second object; and re-synchronize the one or more actions of the one or more first objects with the first clock in response to detecting the de-selection of the selected second object.

15. The computing device according to claim 10, the at least one processor being further configured to provide a control option on the display that when selected is configured to define a ratio of the second execution speed to the first execution speed.

16. The computing device according to claim 10, the at least one processor being further configured to:
   connect a plurality of computing devices to a server to facilitate an online multiplayer gaming system;
   render the game view concurrently on respective displays of the plurality of computing devices;
   coordinate the one or more actions of the one or more first objects in the game play on the plurality of computing devices via the server;
   change the first execution speed of the one or more first objects in the game play on each of the plurality of computing devices to the second execution speed upon detection of a selection of the second object on any one of the plurality of computing devices; and
   change the second execution speed of the one or more first objects in the game play to the first execution speed on each of the plurality of computing devices upon detection of the de-selection of the second object.

17. A computer program product comprising a non-transitory computer readable medium with machine readable instructions thereon, which when executed by a computing device are configured to cause the computing device to:
   render a game view on the display, the game view comprising a first area and a second area, wherein the first area further comprises a third area and a fourth area;
   cause one or more first objects to be presented in the fourth area and to execute one or more actions in the fourth area at a first execution speed;
   detect a selection of a second object in the second area;
   cause the one or more first objects to execute the one or more actions in the fourth area at a second execution speed during the detected selection of the second object responsive to the detected selection of the second object;
   detect a release of the selection of the second object in a third area;
   cause the one or more first objects to execute the one or more actions in the fourth area at the first execution speed responsive to the detected release of the selection of the second object;
   move the second object from the third area to the fourth area with the first execution speed; and
   perform an operation on the one or more first objects with the second object in the fourth area.

* * * * *